US010765177B2

(12) United States Patent
Hamada

(10) Patent No.: US 10,765,177 B2
(45) Date of Patent: Sep. 8, 2020

(54) SLIDER FOR SLIDE FASTENER

(71) Applicant: YKK Corporation, Tokyo (JP)

(72) Inventor: Yoshikazu Hamada, Toyama (JP)

(73) Assignee: YKK Corporation (JP)

( * ) Notice: Subject to any disclaimer, the term of this patent is extended or adjusted under 35 U.S.C. 154(b) by 0 days.

(21) Appl. No.: 16/461,831

(22) PCT Filed: Nov. 30, 2016

(86) PCT No.: PCT/JP2016/085602
§ 371 (c)(1),
(2) Date: May 17, 2019

(87) PCT Pub. No.: WO2018/100691
PCT Pub. Date: Jun. 7, 2018

(65) Prior Publication Data
US 2019/0357637 A1 Nov. 28, 2019

(51) Int. Cl.
*A44B 19/26* (2006.01)
*A44B 19/30* (2006.01)
(Continued)

(52) U.S. Cl.
CPC .......... *A44B 19/262* (2013.01); *A44B 19/308* (2013.01); *A44B 19/265* (2013.01);
(Continued)

(58) Field of Classification Search
CPC ..... A44B 19/26; A44B 19/262; A44B 19/265; A44B 19/30; A44B 19/303; A44B 19/308; B29C 45/14467; B29L 2005/00
See application file for complete search history.

(56) References Cited

U.S. PATENT DOCUMENTS 4,570,309 A 2/1986 Ishii
6,654,988 B1 * 12/2003 Chung ................. A44B 19/308
24/419
(Continued)

FOREIGN PATENT DOCUMENTS

JP 58-165805 A 9/1983
JP H4-32974 U 8/1992
(Continued)

OTHER PUBLICATIONS

International Search Report, PCT Application No. PCT/JP2016/085602, dated Feb. 28, 2017.
(Continued)

*Primary Examiner* — Robert Sandy
*Assistant Examiner* — David M Upchurch
(74) *Attorney, Agent, or Firm* — Kilpatrick Townsend & Stockton LLP

(57) ABSTRACT

A slider is provided with a tab insertion gap between an upper blade of a slider body and a free end portion of a cover body and an open and close member for opening and closing the tab insertion gap. The open and close member is disposed alongside a stop pawl body in the slider width direction, and is also disposed such that a rear end part of the open and close member can swing vertically between a passing position where a attaching shaft portion of a tab passes through and a blocking position where the passing of the attaching shaft portion of the tab is blocked. The open and close member is urged toward the blocking position. The slider can attach the tab afterward, has a stop mechanism, and can significantly reduce manufacturing costs.

12 Claims, 11 Drawing Sheets

(51) Int. Cl.
    *B29C 45/14*     (2006.01)
    *B29L 5/00*     (2006.01)

(52) U.S. Cl.
    CPC ....... *A44B 19/303* (2013.01); *B29C 45/14467* (2013.01); *B29L 2005/00* (2013.01)

(56) References Cited

U.S. PATENT DOCUMENTS

| | | |
|---|---|---|
| 9,226,550 B1 | 1/2016 | Lin |
| 2008/0222854 A1* | 9/2008 | Keyaki ................. A44B 19/26 24/429 |
| 2010/0186200 A1 | 7/2010 | Chan |

FOREIGN PATENT DOCUMENTS

| | | |
|---|---|---|
| JP | 2009-106611 A | 5/2009 |
| JP | 2016-93479 A | 5/2016 |
| WO | 2014/080532 A1 | 5/2014 |

OTHER PUBLICATIONS

Notice of Reasons for Refusal, Japanese Patent Application No. 2018-553584, dated Mar. 5, 2020.

\* cited by examiner

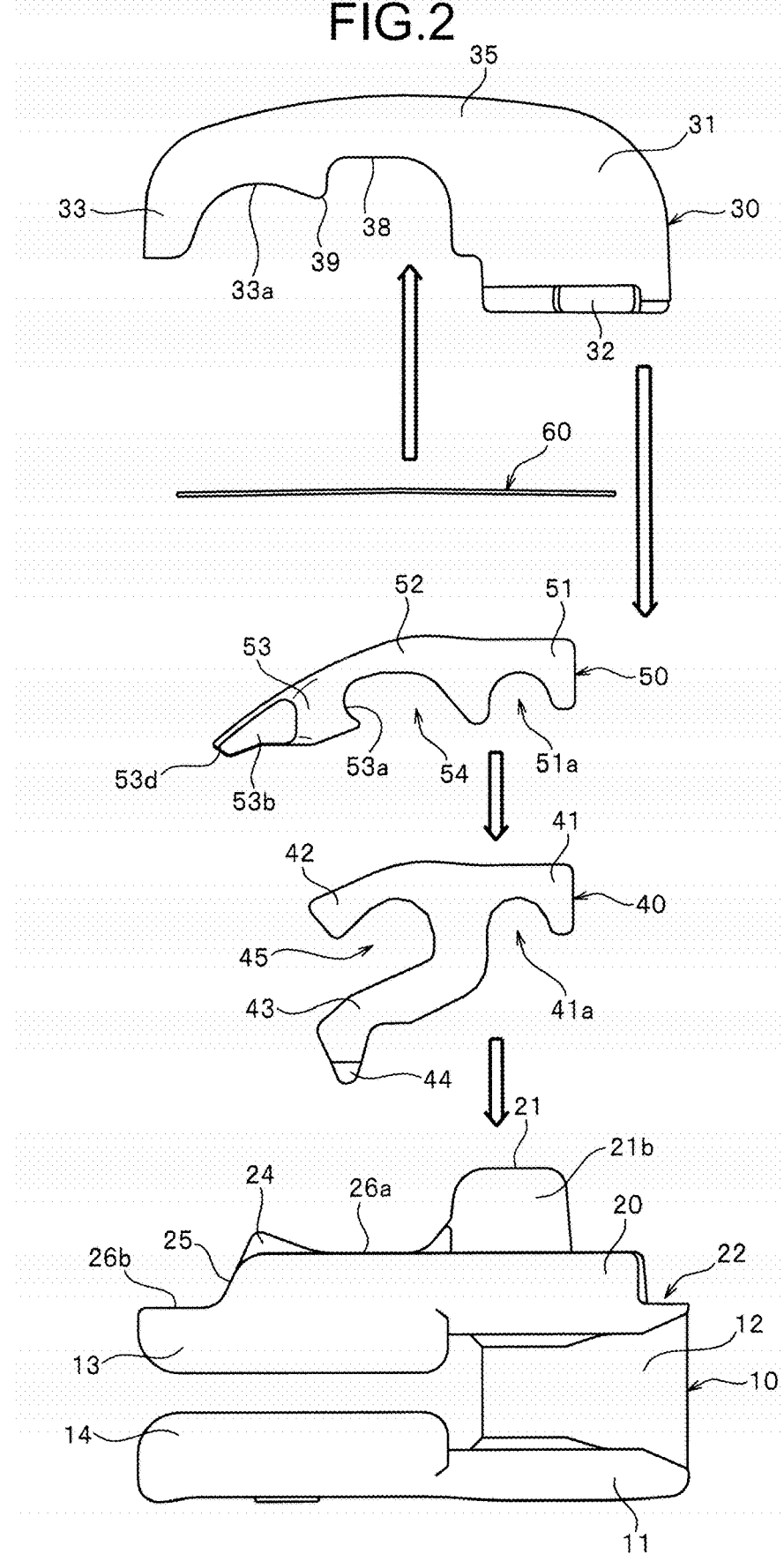

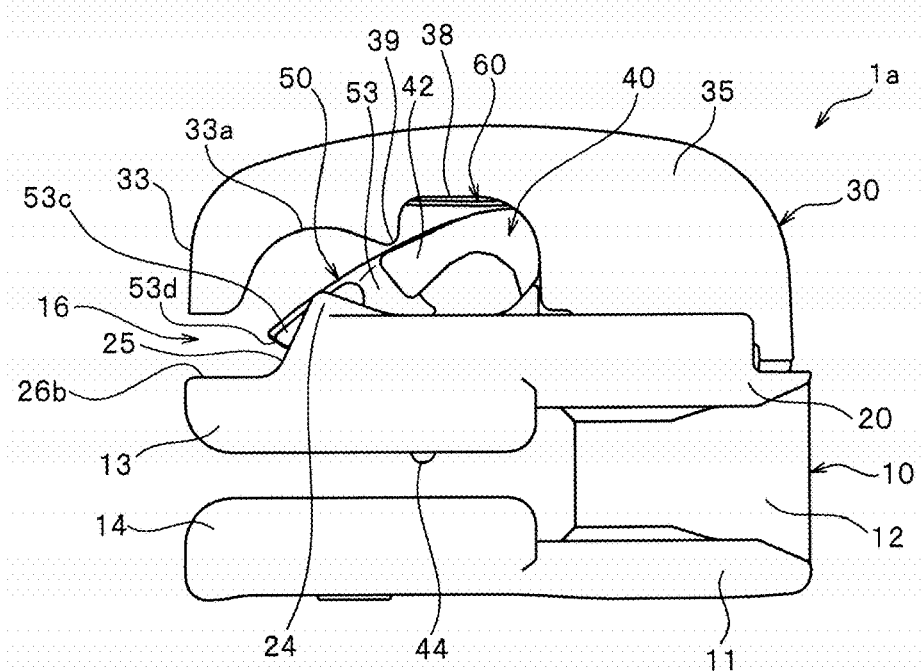
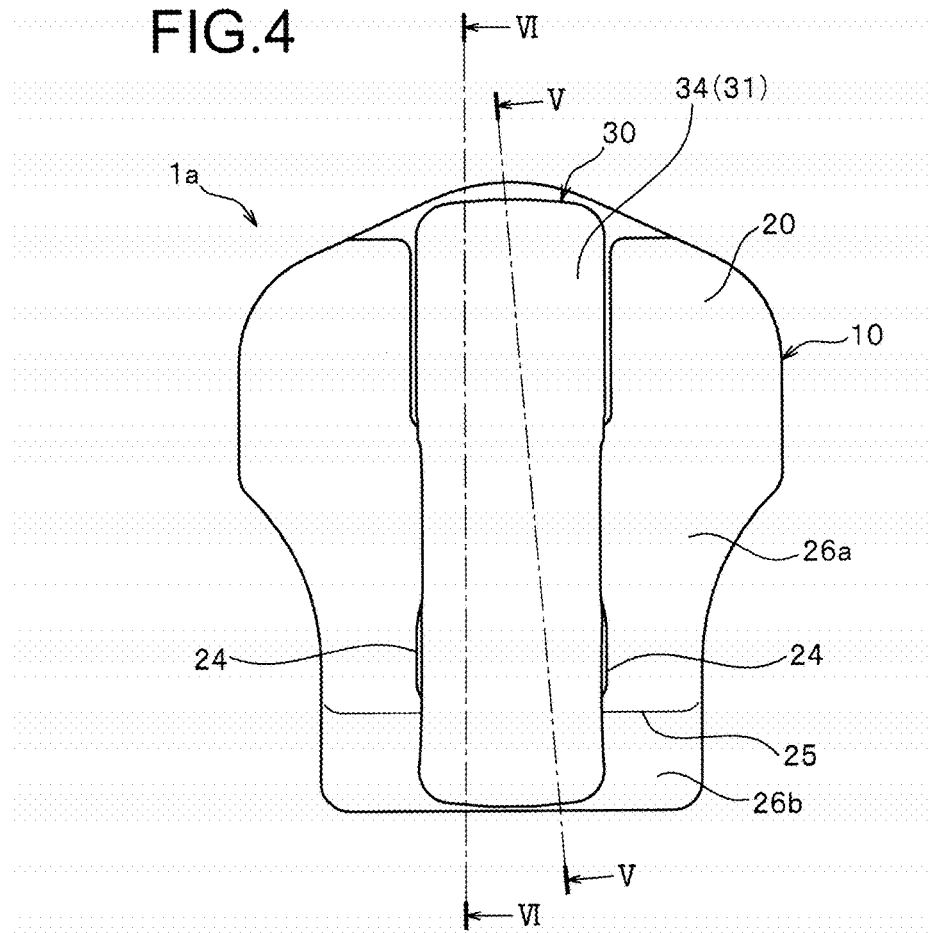

SLIDER FOR SLIDE FASTENER

TECHNICAL FIELD

The invention relates to a slider used in a slide fastener, particularly the slider in which a tab can be attached afterward to a slider body to which a cover body is fixed.

BACKGROUND ART

In the slide fastener, right and left element rows are separated or coupled by sliding a slider along the element rows. Generally, the slider mainly has a slider body having an upper blade and a lower blade connected by a guide column at a front end side with a predetermined interval, a tab as a picking portion for operating the slider and a cover body (also referred to as a tab holding body) holding the tab movably and rotatably between the upper blade of the slider body.

Conventionally, a slider is known that a tab having a desired color and a shape can be attached later to a slider body to which the cover body is fixed so that manufacturers of bags or clothing can easily correspond to customers' demand or favor. Also known is a slider provided with a stop mechanism which holds the slider at a stop position of the slider not to slide at the time of non-operation of the slider by having a stop pawl body as a structural component of the slider.

The slider to which a tab can be attached later and having a stop mechanism is disclosed in, for example, Utility Model Publication H4-32974 (Patent Document 1), International Publication WO 2014/080532 A1 (Patent Document 2), Japanese Patent Application Publication No. 2009-106611 (Patent Document 3) and the like.

The slider disclosed in Patent Document 1 and Patent Document 2, for example, has a slider body, a tab, a cover body, a stop pawl body, a first urging member (first elastic member) which urges the stop pawl body, a sliding member fitted to be able to slide on the upper blade of the slider body so that the tab can be attached later, and a second urging member (second elastic member) urging the sliding member, as component parts of the slider.

The slider of Patent Document 2 is explained briefly referring to FIGS. 17 and 18. The slider 80 of Patent Document 2 shown on FIGS. 17 and 18 has a slider body 83 having an upper blade 81 and a lower blade 82, a tab 85 on which an attaching shaft portion 84 is disposed at one end part, a cover body 86 fixed as a cantilever state on the upper blade 81, a stop pawl body 88 disposed to be swingable at the slider body 83 by a pivot pin 87, and a plate spring member 89 which urges the stop pawl body 88, a sliding member 91 fitted to be able to slide in a guide groove 81a provided on an upper surface part of the upper blade 81, and a coil spring 92 which urges the sliding member 91.

In this case, the plate spring member 89 is provided at a spring chamber 83a provided at a front end part of the slider body 83. A base end part of the stop pawl body 88 is placed on the plate spring member 89, and the base end part of the stop pawl body 88 is urged upward. The stop pawl body 88 is pivoted in a swingable manner by the pivot pin 87.

Therefore, the stop pawl body 88 is urged by the plate spring member 89, moves the pawl portion 88a provided on a rear end part of the stop pawl body 88 downward, and protrudes it in an element guide path formed between the upper blade 81 and the lower blade 82 of the slider body 83.

The sliding member 91 is fitted in a guide groove 81a of the upper blade 81 in a state of being urged rearward by the coil spring 92. In this case, the protruded piece portion 81b protruded at the rear end part of the upper blade 81 is pushed to be bent inward, thereby the sliding member 91 is prevented from being dropped from the guide groove 81a of the upper blade 81.

In the slider 80 of Patent Document 2, a primary assembly body 80a of the slider 80 as shown in FIG. 18 is prepared by assembling the above-mentioned coil spring 92, the sliding member 91, the plate spring member 89, the stop pawl body 88 and the cover body 86 to the slider body 83 serially.

Next, the attaching shaft portion 84 of the tab 85 is inserted to the prepared primary assembly body 80a from a gap (tab insertion gap) between the upper blade 81 and a free end portion of the cover body 86 by pressing and sliding the sliding member 91 by the attaching shaft portion 84, thereby the tab 85 is attached to the primary assembly body 80a. Thus, the slider 80 is manufactured.

When the tab 85 is attached to the primary assembly body 80a, the sliding member 91 is pressed and slid in a slider length direction (slider sliding direction) by the attaching shaft portion 84 of the tab 85. In Patent Document 2, a two-step operation to press the sliding member 91 (two step sliding operation) is performed by moving the attaching shaft portion 84 of the tab 85 to a shelter concave portion 86a provided at the free end portion of the cover body 86.

In the above-mentioned Patent Document 2, the tab 85 in a desired color and a shape can be attached afterward to the primary assembly body 80a of the slider body 80. Further, the slider 80 of Patent Document 2 has a stop mechanism with the stop pawl body 88 urged by the plate spring member 89.

Meanwhile, as shown in FIG. 19, for example, the slider 100 in Patent Document 3 has a slider body 101, a tab 102, a cover body 103, a stop pawl body 104 and a sliding member 105 as component parts. Further, in the slider of Patent Document 3, the stop pawl body 104 and the sliding member 105 are urged by one plate spring member 106.

That is, in the slider 80 of the above-mentioned Patent Document 2, the stop pawl body 88 and the sliding member 91 are urged by different urging members (i.e. the plate spring member 89 and the coil spring 92) respectively. In the slider 100 of Patent Document 3, the stop pawl body 104 and the sliding member 105 are urged by the single plate spring member 106 fixed to the cover body 103. Thereby, the slider 100 of Patent Document 3 can be formed of a fewer number of slider component parts compared with the slider of Patent Document 1 or the slider 80 of Patent Document 2. Therefore, reduced manufacturing cost and more efficiency of assembly works are expected.

PRIOR ART DOCUMENTS

Patent Document

Patent Document 1: JPU H4-32974 B
Patent Document 2: WO 2014/080532 A
Patent Document 3: JP2009-106611 A

SUMMARY OF THE INVENTION

Problems to be Solved by the Invention

In the sliders described in Patent Documents 1 to 3, the sliding member urged by the urging member is attached to be able to slide to the upper blade of the slider body as a slider component part in order to be able to attach a tab to the primary assembly body of the slider.

Meanwhile, in a slider of a slide fastener, a height dimension of the slider is limited in some cases not to be too large depending on the intended use of fastener attached products to which the slide fastener is attached. However, by providing the sliding member which slides in a front and rear direction in the slider, the tab can be attached afterward without being obstructed by the height dimension of the slider (without minding the height limit).

In order to attach the sliding member which enables the tab to be attached afterward to the upper blade of the slider body, it is required to provide a guide groove having a complicated shape on the upper blade from a rear mouth side end part of the upper blade toward the front for fitting to be able to slide the urging member.

Meanwhile, the slider body is generally prepared by die cast molding of a metal material such as aluminum alloy or zinc alloy, or injection molding of a thermoplastic resin material such as polyamide or polyacetal. However, when the slider body has the guide groove in a complicated shape as mentioned above, it may lead to an increase in production cost of a molding die.

Also, in the die cast molding and the injection molding, plural pieces of the same shaped molded products are molded simultaneously in one molding step, generally. However, when the slider body has the guide groove in a complicated shape as mentioned above, it may lead to a decrease in the number of molded products which can be molded in one molding step of the slider body.

Further, in the slider of Patent Document 1 or the slider 80 of Patent Document 2, when the primary assembly body 80a of the slider 80 is assembled, detailed works need to be performed serially and precisely such that the urging member (coil spring 92) urging the sliding member 91 is first attached to the slider body 83, the sliding member 91 is inserted into the guide groove 81a behind the slider body 83, and further pressing the right and left protruded piece portions 81b protruded at the rear end part of the upper blade 81 to plastically deform so as to bend inward not to drop off the sliding member 91 from the guide groove 81a.

Also in the slider 100 of Patent Document 3, detailed works need to be performed precisely such that the sliding member 105 is inserted into the guide groove behind the slider body 101, then the right and left protruded piece portions protruded at the rear end part of the upper blade is pressed to be plastically deformed. Therefore, it has been pointed out that an assembly work of the primary assembly body tends to be cumbersome, the assembly work cannot be streamlined, and a cost for the assembly work is increased.

Accordingly, although the slider of Patent Documents 1 to 3 in which the sliding member is attached to be able to slide to the upper blade of the slider body is formed to be able to attach the tab to the primary assembly body (i.e. the tab can be attached afterward), and has a stop mechanism, the manufacturing cost tends to increase for the reason as above, and an attempt for cost reduction has been demanded.

The invention has been accomplished in consideration to the aforementioned problems in the related art. A specific object of the invention is to provide a slider to which a tab can be attached afterward, and which has a stop mechanism with a stop pawl body, has a shape which can improve moldability of the slider body and assembly workability of the primary assembly body, and can be provided at a low cost.

Solution to Problem

To achieve the above object, one of the main characteristics of a slider for a slide fastener provided by the invention is that the slider includes, as a basic configuration: a slider body in which an upper blade and a lower blade are connected with a guide column; a tab provided with an attaching shaft portion at one end part; a stop pawl body provided with a pawl base end portion, an upper arm portion and a lower arm portion extending from the pawl base end portion, and a pawl portion disposed on the lower arm portion; and a cover body accommodating a part of the stop pawl body therein and fixed to the upper blade in a cantilever shape; the stop pawl body is urged toward the upper blade, a tab insertion gap in which the attaching shaft portion of the tab can be passed through is provided between the upper blade and a free end portion of the cover body, the stop pawl body has the upper arm portion and the lower arm portion disposed to be swingable up and down with respect to the slider body, the stop pawl body is urged toward the upper blade to make the pawl portion protruded to an element guide path formed between the upper blade and the lower blade, in which an open and close member is disposed alongside the stop pawl body in a slider width direction, and is disposed so that a rear end part of the open and close member is swingable up and down between a passing position at which the tab insertion gap is opened and the attaching shaft portion of the tab is passed, and a blocking position at which the attaching shaft portion is blocked not to be passed with respect to the slider body; and the open and close member is urged toward the blocking position.

In the slider according to the present invention, it is preferable that an urging member which urges the stop pawl body and the open and close member is disposed.

It is preferable that the open and close member has a supported base portion, a cross-link portion extending rearward from the supported base portion so as to extend across the above of the attaching shaft portion of the tab and a stopper portion extending rearward from the cross-link portion and bulging downward so as to block the rear side of the attaching shaft portion of the tab, and a front end part of the stopper portion has a tab axis receiving surface.

In this case, the tab axis receiving surface is preferably curved or sloped so that the lower end part of the stopper portion is sloped downward to the front. Further, the stopper portion of the open and close member preferably has a wide width portion formed to be larger than the cross-link portion in the slider width direction.

In the present invention, it is also preferable that an attaching support column stands on a front end part of the upper blade, and the pawl base end portion of the stop pawl body and the supported base portion of the open and close member are supported by the attaching support column to be swingable.

In the slider of the present invention, it is preferable that the upper blade has a right and left pair of vertical wall portions standing on a rear half part of the upper blade, and the free end portion of the cover body has facing edge portions formed in a concave shape directed downward to face the vertical wall portions in a side surface view of the slider.

In the slider of the present invention, it is preferable that the upper blade has the right and left pair of vertical wall portions disposed to be apart in the slider width direction to have an interval into which the stopper portion of the open and close member can insert, and the right and left vertical wall portions are disposed so that the interval between the right and left vertical wall portions corresponds to the maximum dimension of the stopper portion in the slider width direction.

In a case that the upper blade has the right and left pair of the vertical wall portions as mentioned above, it is preferable that the upper blade has a first upper surface which the tab is contacted with, a second upper surface disposed behind the first upper surface and at a lower height position than the first upper surface, and a step portion provided behind the right and left vertical wall portions and disposed between the first upper surface and the second upper surface.

In this case, it is particularly preferable that the open and close member has a rear end protruded portion protruded rearward of the right and left vertical wall portions, and the rear end protruded portion of the open and close member has a contact surface disposed in a direction crossing a step surface of the step portion in a side view of the slider, and contacting the attaching shaft portion at the time inserting the tab.

Further, in the slider of the present invention, it is preferable that the urging member is formed of a single plate spring member which urges the open and close member and the stop pawl body.

Effect of the Invention

A slider of the present invention has a slider body in which a substantially Y-shaped element guide path is provided between an upper blade and a lower blade, a tab provided with an attaching shaft portion (link portion) at one end part, a stop pawl body in which an upper arm portion and a lower arm portion extend rearward from a pawl base end portion, an open and close member which opens and closes a tab insertion gap formed between the upper blade and a free end portion of a cover body, and the cover body fixed by the upper blade of the slider body in a cantilever shape and regulating a movement range of the attaching shaft portion of the tab.

The stop pawl body of the present invention is urged so that a rear end part of the stop pawl body (i.e. the upper arm portion and the lower arm portion) is disposed to be swingable up and down with respect to the slider body, and the pawl portion provided on the lower arm portion of the stop pawl body is protruded into the element guide path of the slider body. Thereby, the slider can be provided with a stop mechanism such that, when the slider is not operated, the pawl portion protruded in the element guide path of the stop pawl body is stopped in an engaging state to fastener elements of element rows to be inserted into the element guide path, and the slider is held (locked) at a stop position with respect to the element rows.

In the slider of the present invention, the open and close member is formed separately from the stop pawl body, and is disposed alongside the stop pawl body in the slider width direction. That the open and close member is disposed alongside the stop pawl body in the slider width direction here means at least a part of the open and close member is disposed to line laterally (right and left direction) so as to be along the stop pawl body, which includes not only a case at least a part of the open and close member and the stop pawl body are parallel to each other, but also a case the open and close member is disposed along the stop pawl body in a state a center part in the width direction of at least a part of the open and close member is oblique with respect to the stop pawl body in a range at a predetermined oblique angle (20°, for example) or smaller. In this case, in particular, it is preferable that at least a part of the open and close member and the stop pawl body are disposed so as to be along the slider length direction.

The open and close member disposed alongside the stop pawl body is disposed so that the rear end part of the open and close member is swingable up and down between a passing position at which the tab insertion gap is opened to be able to pass the attaching shaft portion of the tab, and a blocking position at which the attaching shaft portion of the tab is blocked not to be passed. Further, the open and close member is urged toward the blocking position.

For the slider of the present invention, the tab can be attached to the slider (primary assembly body) afterward by swinging the open and close member between the blocking position and the passing position even when a sliding member as mentioned in Patent Documents 1 to 3 is not used.

Further, by arranging the open and close member which is swingable up and down alongside the stop pawl body in which the upper arm portion and the lower arm portion are swingable up and down as mentioned above, the slider can be formed without specifically increasing a height dimension of the entire slider. Therefore, even in a case the height limit is required in the slider, the slider of the present invention can be used substantially as same as conventional sliders having the sliding member as in the above-mentioned Patent Documents 1 to 3.

In addition, since the slider of the present invention does not use the sliding member as in the above-mentioned Patent Documents 1 to 3, it is not needed to provide a guide groove for fitting the sliding member or a protruded piece portion for preventing a drop of the sliding member in the slider body. Therefore, the slider body can be formed in a simpler shape or a simpler structure than the slider bodies of Patent Documents 1 to 3 as mentioned above.

Therefore, a molding die used for molding the slider body can be formed in a simpler structure than the cases of Patent Documents 1 to 3, thereby a production cost of the molding die can be reduced. Further, the molding number of the slider bodies which can be molded in a single molding step can be easily increased than the cases in Patent Documents 1 to 3.

Further, as described later, in a case of the slider of the present invention, when a primary assembly body of the slider is assembled, the open and close member can be easily assembled by placing it at a predetermined position of the slider body so as to line with the stop pawl body, thereby detailed and cumbersome work such as assembly work of the slider in Patent Documents 1 to 3 is not required. Thus, the assembly workability of the slider can be significantly improved for the slider of the present invention.

Accordingly, the slider of the present invention can reduce a production cost significantly compared with the sliders of Patent Documents 1 to 3. Therefore, the slider formed to be able to attach the tab afterward and having a stop mechanism can be commercially provided at a lower price than before.

In the present invention, the open and close member and the stop pawl body are separately formed as different members, thereby when the tab is pulled to slide the slider, the open and close member and the stop pawl body can be separately and independently swung, and a timing of the swing (in other words, a timing that the attaching shaft portion of the tab contacts and lifts) can be different between the open and close member and the stop pawl body. Therefore, even when the stop pawl body is lifted by the attaching shaft portion of the tab, and thereby a lock state of the slider is released, the open and close member is not lifted to the passing position together with the swing of the stop pawl body because the open and close member and the stop pawl body are separately moved. Thus, the open and close member stably prevents the attaching shaft portion of the tab which is held between the slider body and the cover body from passing through the tab insertion gap and exiting to an outside.

In such a slider according to the present invention, the urging member which urges the stop pawl body and the open and close member is disposed by being attached to the cover body, for example. Using such an urging member enables the stop pawl body to be stably urged so that the pawl portion is protruded in the element guide path of the slider body. The open and close member can also be urged stably toward the blocking position. In this case, it is preferable that the urging member urges the stop pawl body in a direction that the pawl portion is protruded in the element guide path, and the same urging member which urges the stop pawl body urges the open and close member toward the blocking position. In the present invention, it is also possible for the stop pawl body to be formed such that an urging portion (elastic piece) which urges the stop pawl body is integrally provided to the stop pawl body. It is also possible for the open and close member to be formed such that the urging portion (elastic piece) which urges the open and close member is integrally provided to the stop pawl body. Thereby, the stop pawl body can be urged so that the pawl portion is protruded in the element guide path and the open and close member can be urged toward the blocking position, without setting an independent urging member to the slider.

In the present invention, the open and close member has a supported base portion disposed at a front end part of the open and close member, a cross-link portion extending rearward from the supported base portion so as to extend over the above of the attaching shaft portion of the attached tab, and a stopper portion extending rearward from the cross-link portion and bulging downward so as to block the behind of the attaching shaft portion of the tab. A front end part of the stopper portion has a tab axis receiving surface which can contact with the attaching shaft portion of the tab.

Thereby, the open and close member of the present invention can be formed in a relatively simple shape, and can be stably attached to the slider body so that the rear end part of the open and close member can swing in the upper and lower direction between the passing position and the blocking position with respect to the slider body. Further, the open and close member having the above-mentioned shape can stably block the tab insertion gap so that the attaching shaft portion of the tab held between the slider body and the cover body does not exit to an outside.

In this case, it is preferable that the pawl base end portion of the stop pawl body and the supported base portion of the open and close member are pivoted directly to the slider body, or pivoted indirectly to the slider body by using a pivot pin as described later or the like, for example.

The meaning that the stop pawl body and the open and close member are pivoted to the slider body is that a convex part and a concave part are provided on corresponding parts, the convex part and the concave part are contacted, thereby the stop pawl body and the open and close member are relatively supported in a rotatable (swingable) manner. As an example that the stop pawl body and the open and close member are pivoted to the slider body, a case is included that the concave part provided at the stop pawl body and the open and close member covers the convex part in an arc shape provided to the slider body directly or indirectly, and at least a part of the concave part slide-contacts or is in contact with the convex part and swing.

In the open and close member of the present invention, the tab axis receiving surface of the stopper portion is curved or sloped such that a lower end part of the stopper portion is sloped downward to the front. This prevents the attaching shaft portion of the tab from coming around under the stopper portion when the attaching shaft portion of the tab is contacted with the stopper portion of the open and close member, and the attaching shaft portion of the tab can be effectively prevented from entering into the tab insertion gap and exiting.

The stopper portion of the open and close member has a wide width portion formed to be larger in the slider width direction than the cross-link portion. Thereby strength of the stopper portion can be enhanced. In addition, since the open and close member is urged by the urging member, the tab insertion gap can be more stably blocked with the thick stopper portion. Further, when the slider (the primary assembly body) is assembled, a positioning operation of the open and close member can be performed easily, and a positioning operation of the stop pawl body disposed alongside the open and close member can also be performed easily. Therefore, assembly workability of the slider can be further improved.

In the slider of the present invention, an attaching support column stands on a front end part of the upper blade, and by the attaching support column, a pawl base end portion of the stop pawl body and a supported base portion of the open and close member are contacted and respectively supported in a swingable manner. Thereby, the slider capable of attaching the tab afterward and having a stop mechanism can be formed in a relatively simple structure. Also the stop pawl body and the open and close member attached to the slider can be assembled with the attaching support column stably in a swingable manner, and the stop pawl body and the open and close member can be separately and smoothly swung.

In the slider of the present invention, the upper blade of the slider body has a right and left pair of vertical wall portions standing at a rear half part of the upper blade. The rear half part of the upper blade here means a part disposed on the rear mouth side from the center position of the upper blade in the length direction.

In a case that the attaching shaft portion of the tab is formed relatively long or formed in an arc shape as a shape of the tab, for example, and when the attaching shaft portion of the tab is held between the slider body and the cover body, the attaching shaft portion of the tab may have a holding part disposed under the cover body and an exposed part being outside of the cover body (the part except for the holding part) in some cases.

In a state that such a tab is attached to a general ordinary slider, when the tab is oblique so as to twist with respect to the cover body, for example, the exposed part of the attaching shaft portion may enter into the tab insertion portion between the upper blade and the free end portion of the cover body. If the exposed part of the attaching shaft portion enters into the tab insertion gap in a state that the attaching shaft portion of the tab is held between the slider body and the cover body, the open and close member may be lifted by the exposed part of the attaching shaft portion, and as a result, the tab is twisted and the attaching shaft portion of the tab may exit from between the slider body and the cover body.

In contrast, the right and left pair of the vertical wall portions as mentioned above are provided at the rear half part of the upper blade. Therefore, even when the tab attached to the slider is oblique so as to twist with respect to the cover body, for example, the vertical wall portions can effectively prevent the exposed part of the attaching shaft portion from entering into the tab insertion gap. For this reason, defects such as exiting the attaching shaft portion from between the slider body and the cover body due to the twist of the tab as mentioned above can be prevented.

Further in this case, since the free end portion of the cover body has facing edge parts formed to face the vertical wall portions and in a concave shape downward in a side view of the slider, the tab insertion gap provided between the upper blade and the cover body can secure a size capable of passing the attaching shaft portion of the tab through stably although the right and left vertical wall portions are provided at the rear half part of the upper blade as mentioned above.

In the slider of the present invention, the upper blade has the right and left pair of the vertical wall portions disposed apart in the slider width direction to have an interval capable of inserting the stopper portion of the open and close member, and the right and left vertical wall portions are disposed to have an interval between the right and left vertical wall portions (a dimension in the slider width direction) to correspond to the maximum dimension of the stopper portion in the slider width direction.

Since such right and left pair of the vertical wall portions are provided on the upper blade, the exposed part of the attaching shaft portion of the tab can be effectively prevented from entering into the tab insertion gap even when the tab attached to the slider is oblique so as to twist with respect to the cover body, for example. In addition, when the open and close member is attached to the slider body in the assembly work of the primary assembly body of the slider, a positioning of the open and close member can be conducted without fail, thereby the assembly workability can be further improved. Further, the position of the open and close member assembled to the slider body can be effectively prevented from being displaced, thereby trouble or damage of the slider is less likely to occur.

Further, when the upper blade has the right and left pair of the vertical wall portions as mentioned above, the upper blade has a first upper surface which the tab attached to the slider contacts in the non-operation state, a second upper surface disposed behind the first upper surface at a lower height position than the first upper surface, and a step portion provided behind the right and left vertical wall portions and disposed between the first upper surface and the second upper surface. Thereby, despite the right and left vertical wall portions are provided on the upper blade, the attaching shaft portion of the tab can be made to be easily inserted into the tab insertion gap between the upper blade and the free end portion of the cover body without making a height dimension of the entire slider large. Therefore, the tab can be attached to the primary assembly body of the slider more easily.

Further in this case, the open and close member has a rear end protruded portion protruded the rearward of the right and left vertical wall portions. The rear end protruded portion of the open and close member has a contacting surface which is disposed in a direction crossing a step surface of the step portion in the side view of the slider and promoting the open and close member to swing by contacting the attaching shaft portion at the time of insertion of the attaching shaft portion of the tab. Thereby, when the attaching shaft portion of the tab is inserted into the tab insertion gap between the upper blade and the free end portion of the cover body, the open and close member of the tab can be lifted in resistance to the urging force (elasticity) of the urging member by the attaching shaft portion of the tab to be moved to a passing position. Therefore, the tab can be easily and stably attached to the primary assembly body of the slider.

In the slider of the present invention, the urging member is formed of a single plate spring member which urges the open and close member and the stop pawl body. Since the urging member is formed of the single plate spring member, cost can be suppressed compared with a case using a coil spring, for example. Further, the slider of the present invention can be formed without increasing the number of component parts of the slider compared with a case of the slider in the Patent Document 3, for example. In addition, attaching operation of the urging member to the slider body or the cover body can be performed relatively easily.

BRIEF DESCRIPTION OF DRAWINGS

FIG. 2 is a side view showing a state that a primary assembled body of the slider is disassembled;

FIG. 3 is a side view of the primary assembly body;

FIG. 4 is a plan view of the primary assembly body;

DESCRIPTION OF EMBODIMENT

A detailed description will be hereinafter given of preferable embodiments of the invention with consultation of drawings.

Figure 1:
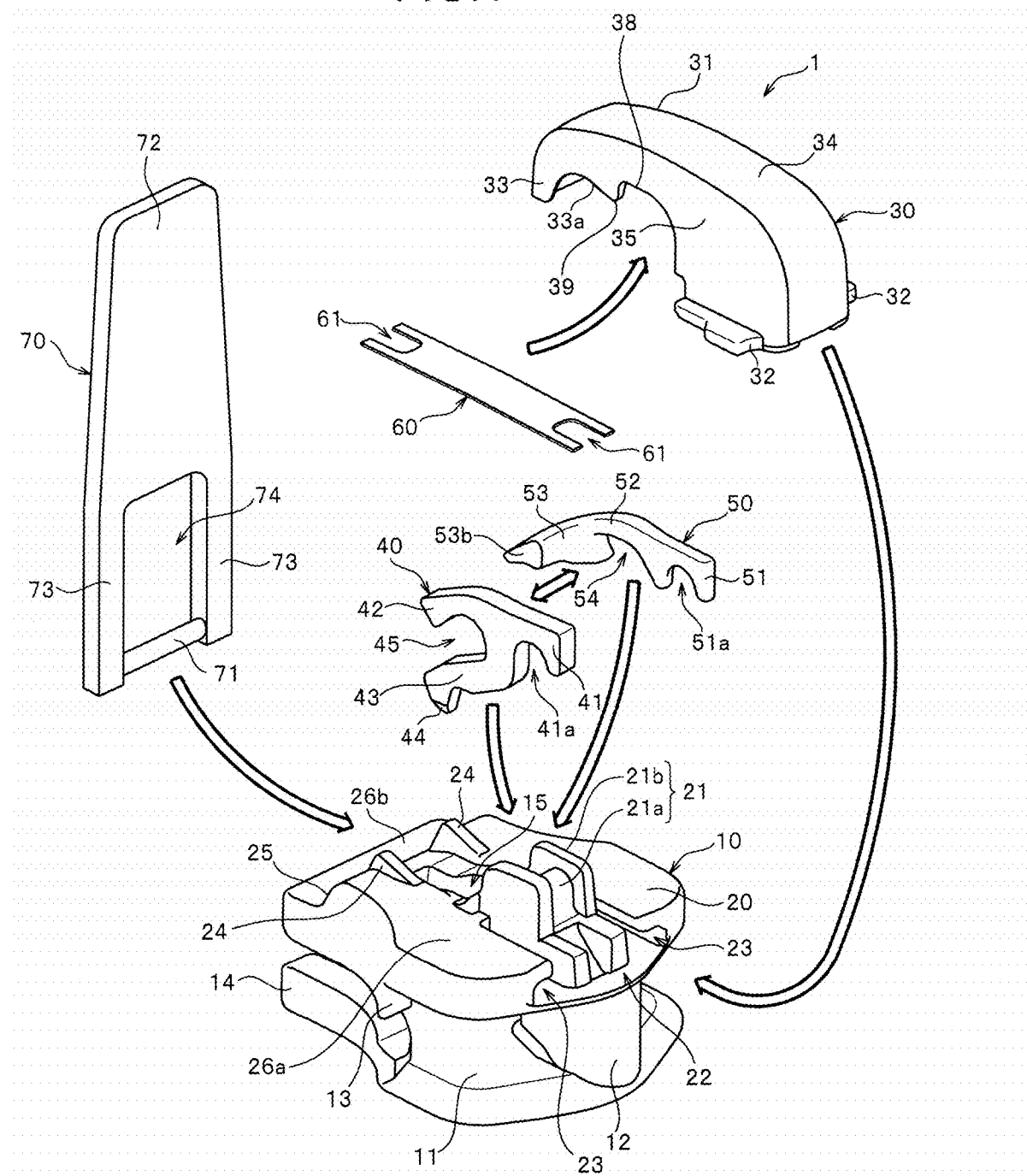
FIG. 1 is a disassembled perspective view showing a disassembled slider according to Embodiment 1 of the invention.
Figure 5:
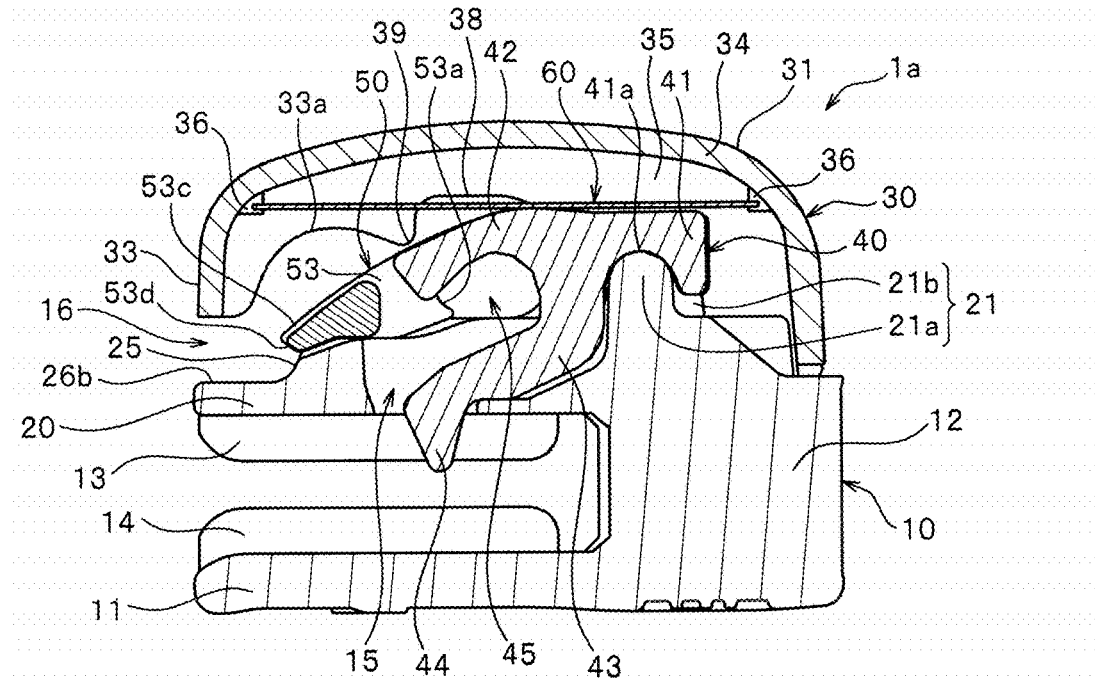
FIG. 5 is a cross-sectional view taken along a line V-V shown in FIG. 4.
Figure 6:
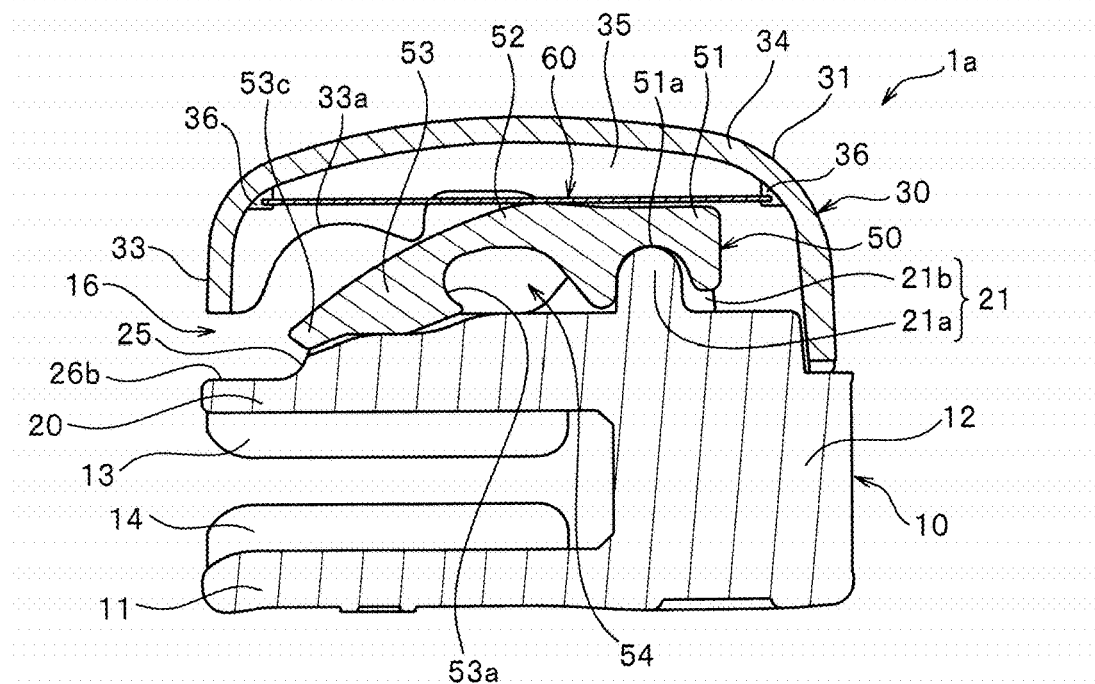
FIG. 6 is a cross-sectional view taken along a line VI-VI shown in FIG. 4.
Figure 7:
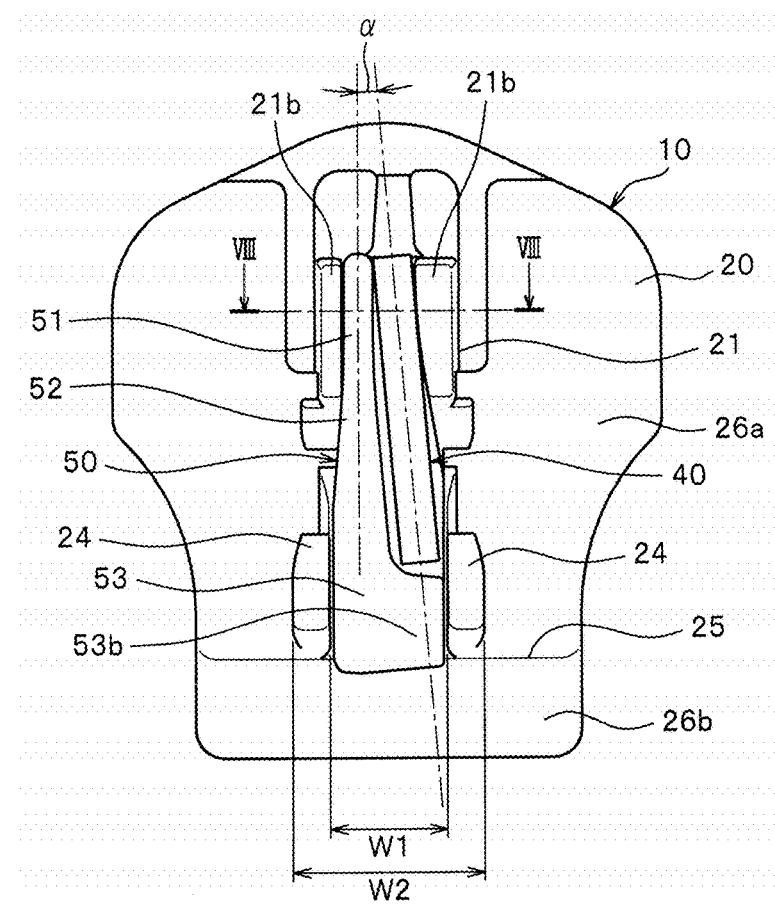
FIG. 7 is a plan view showing an assembled state of the slider body, a stop pawl body and an open and close member.

FIGS. 1 to 14 show the slider for a slide fastener according to the embodiment 1. FIG. 1 is a disassembled perspective view of the slider, and FIG. 2 is a disassembled side view of the primary assembly body of the slider. FIG. 3 and FIG. 4 are a side view and a plan view of the primary assembly body. FIG. 5 and FIG. 6 are cross-sectional views along the line V-V and VI-VI shown in FIG. 4. FIG. 7 is a plan view showing a state that the stop pawl body and the open and close member are assembled to the slider body.

In the descriptions below, a front and rear direction means a slider length direction or a sliding direction, and particularly, a direction in which the slider moves to couple the right and left element rows is the front (shoulder side direction), and a direction in which the slider moves to separate the element rows is the rear (rear mouth side direction). Upper and lower direction means a height direction of the slider, and particularly, a side on which the cover body (or the tab) is attached to the slider body of the slider is the upper, and a direction opposite thereto is the lower. Further, the right and left direction means a slider width direction, and a direction perpendicular to the sliding direction and the height direction of the slider.

The slider 1 for a slide fastener according to Embodiment 1 is formed of six component parts, i.e. a slider body 10, a cover body 30, a stop pawl body 40, an open and close member 50, a plate spring member 60 as an urging member, and a tab 70, and is provided with a stop mechanism with a stop pawl body 40 as described later.

In Embodiment 1, the cover body 30 and the stop pawl body 40 are produced by press-molding or die cast-molding a metal material such as stainless steel, copper alloy or zinc alloy. The slider body 10, the open and close member 50 and the tab 70 are produced by die cast-molding a metal material such as aluminum alloy or zinc alloy. It is also possible to produce the slider body 10, the cover body 30, the stop pawl body 40, the open and close member 50 and the tab 70 by injection-molding a thermoplastic resin material to which thermoplastic resin such as polyamide, polypropylene, polyacetal or polybutylene terephthalate and abrasion-resistant reinforcing material are added instead of metal materials.

The slider body 10 is formed integrally as a whole by die cast molding. The slider body 10 has an upper blade 20, a lower blade 11 disposed parallel to the upper blade 20, a guide column 12 connecting a front end part (shoulder side end part) of the upper blade 20 and a front end part (shoulder side end part) of the lower blade 11, right and left upper flange portions 13 hanging from right and left side parts of the upper blade 20, and right and left lower flange portions 14 standing on right and left side parts of the lower blade 11.

At a front end part of the slider body 10, right and left shoulder mouths are formed to interpose the guide column 12 therebetween, and a rear mouth is formed at a rear end part of the slider body 10. An element guide path having a substantially Y shape is formed to be surrounded by the upper blade 20, the lower blade 11, the right and left upper flange portions 13 and the right and left lower flange portions 14 so as to communicate the right and left shoulder mouths and the rear mouth. At right and left side edge parts of the slider body 10, tape insertion gaps (not shown) for passing fastener tapes through of the slide fastener is formed between the right and left upper flange portions 13 and the right and left lower flange portions 14.

An attaching support column 21 stands on an upper surface of the front end part of the upper blade 20. The attaching support column 21 has a pivot convex portion 21*a* which supports (pivots) the stop pawl body 40 and the open and close member 50 in a swingable manner, and right and left support wall portions 21*b* disposed on right and left sides of the pivot convex portion 21*a*. The right and left support wall portions 21*b* are disposed apart with an interval which can insert (fit) both component parts of the stop pawl body 40 and the open and close member 50. That is, the interval (dimension in the slider width direction) between inner side surfaces of the right and left support wall portions 21*b* is set to be larger than a total size of a width dimension of the pawl base end portion 41 of the stop pawl body 40 and a width dimension of the supported base portion 51 of the open and close member 50.

A dimension in the slider width direction between an outer side surface of the left side support wall portion 21*b* and an outer side surface of the right side support wall portion 21*b* is set to be the same size or slightly smaller than the dimension in the slider width direction between inner wall surfaces of right and left side wall portions 35 of a cover body 30 described later. In the following description, the dimension in the slider width direction may be abbreviated to "width dimension".

On the front end part of the upper blade 20, a fitting concave portion 22 for fitting a fixed end part of the cover body 30 is provided from a front part toward the right and left side parts of the attaching support column 21. Further, on right and left sides of the fitting concave portions 22, right and left slide groove portions 23 are concaved on right and left side from the front end of the upper blade 20 toward a rear end vicinity position of the attaching support column 21. The right and left slide groove portions 23 are formed to extend from a lower end part of the fitting concave portion 22 toward the right and left outer sides in the slider width direction when viewing the slider body 10 from a front side. Further, the right and left slide groove portions 23 are continuously provided in a length direction of the slider 1 corresponding to a shape of a cover flange portion 32, described later, of the cover body 30.

In the upper blade 20, a pawl hole 15 penetrating from an upper surface (a first upper surface described later) 26*a* of the upper blade 20 to the element guide path is formed on a rear side of the attaching support column 21 to have a size able to accommodate a lower arm portion 43, described later, of the stop pawl body 40, and making a pawl portion 44, described later, of the stop pawl body 40 protruded into the element guide path.

In a region behind a center position in the length direction in the upper blade 20 (center position in a length direction at a part having the largest length dimension of the upper blade 20), a right and left pair of vertical wall portions 24 protruded from the upper surface 26*a* of the upper blade 20 in a substantially triangle shape are disposed. Each vertical wall portion 24 has a front side sloped surface sloping downward from an upper end (tip end) of the vertical wall portion 24 toward the front, and a rear side sloped surface sloping downward from the upper end of the vertical wall portion 24 to the rear.

In this case, a slope angle of the front side sloped surface of the vertical wall portion 24 with respect to the upper surface 26*a* of the upper blade 20 is set to be smaller than the slope angle of the rear side sloped surface of the vertical wall portion 24 with respect to the upper surface 26*a* of the upper blade 20. Also, the rear side sloped surface of the vertical wall portion 24 is disposed to form a sloped surface continuing from a step surface of a step portion 25, described later, provided on the upper blade 20 so that a attaching shaft portion 71 of a tab 70 can be smoothly guided when the tab 70 is attached afterward.

The right and left vertical wall portions 24 are disposed apart each other in the slider width direction. In this case, a width dimension W1 between inner wall surfaces of the right and left vertical wall portions 24 is set at a size capable of fitting a stopper portion 53, described later, of the open and close member 50 between the right and left vertical wall portions 24, specifically, at the same size as (or slightly larger than) the maximum dimension in the slider width direction of the stopper portion 53 of the open and close member 50. In this case, the upper surface 26a of the upper blade 20 between the right and left vertical wall portions 24 is a placing surface on which the stopper portion 53 of the open and close member 50 is placed. In Embodiment 1, the placing surface is formed to be a sloped surface sloping downward from the pawl hole 15 rearward to the step portion 25.

Meanwhile, a width dimension W2 between outer wall surfaces of the right and left vertical wall portions 24 is set larger than a width dimension between outer wall surfaces of the right and left side wall portions 35 of the cover body 30. Thereby, in a case of washing a fastener attached product such as clothing, even when the tab 70 attached to the slider 1 is oblique to twist with respect to the cover body 30, for example, the attaching shaft portion 71 of the tab 70 can be prevented by the right and left vertical wall portions 24 from entering into the tab insertion gap 16 provided between the upper blade 20 and the free end portion 33 of the cover body 30.

In the present invention, it is also possible to set the width dimension W2 between the outer wall surfaces of the right and left vertical wall portions 24 equal to or smaller than the width dimension between the outer wall surfaces of the right and left side wall portions 35 of the cover body 30. In this case, in a plan view of the slider 1, the right and left vertical wall portions 24 are hidden by the cover body 30 and not seen, thereby an appearance quality of the slider 1 can be enhanced, and touch feeling of the slider 1 can be improved.

Figure 12:
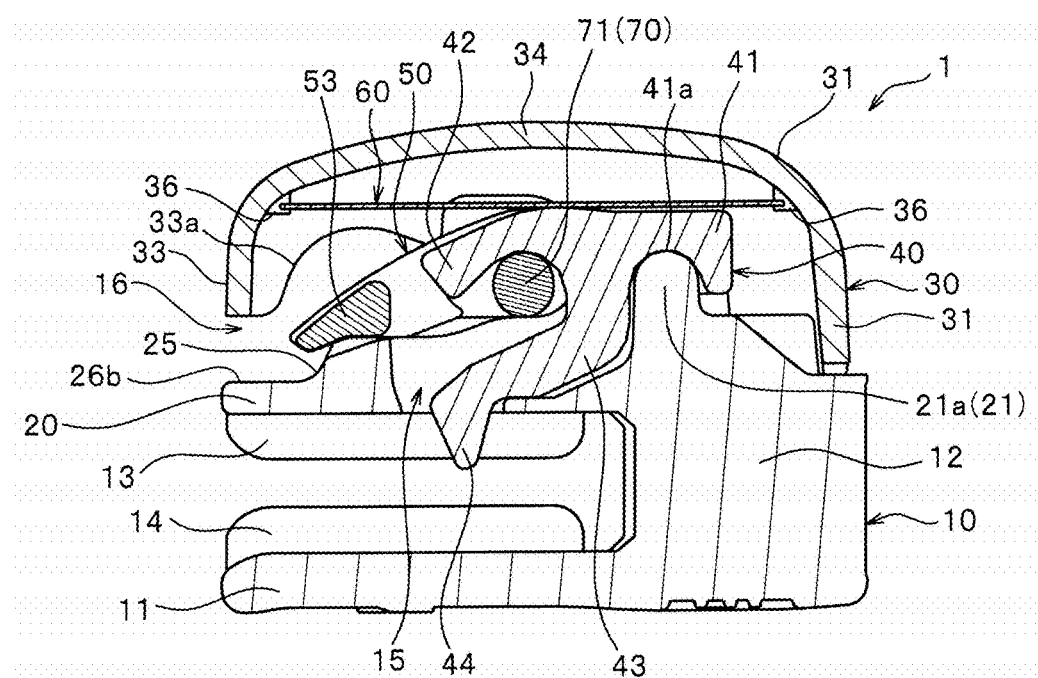
FIG. 12 is a cross-sectional view explaining a state that the attaching shaft portion of the tab is accommodated between an upper arm portion and a lower arm portion of the stop pawl body.

The upper blade 20 of Embodiment 1 has the first upper surface (main upper surface) 26a on which the attaching shaft portion 71 is contacted (placed) at the time of non-operation of the tab 70, as shown in FIG. 12. At a rear end part of the upper blade 20, a second upper surface (rear end side upper surface) 26b formed at a height position lower than the first upper surface 26a of the upper blade 20 is disposed via the step portion 25. Although the right and left vertical wall portions 24 are disposed on the upper blade 20, the attaching shaft portion 71 of the tab 70 can be easily inserted to the tab insertion gap 16 formed between the upper blade 20 and the free end portion 33 of the cover body 30 without making the height dimension of the entire slider 1 large because the second upper surface 26b is formed at the height position lower than the first upper surface 26a by providing the step portion 25. Further, since the step portion 25 is provided, the attaching shaft portion 71 of the tab 70 which is inserted into the tab insertion gap 16 and guided to the step portion 25 can come around under the stopper portion 53 (particularly a rear end protruded portion 53c) of the stopper portion 53, as described later, of the open and close member 50, and the open and close member 50 can be easily lifted with the attaching shaft portion 71 as described later.

The cover body 30 of Embodiment 1 shows a substantially L shape or a substantially concaved shape in a side view, and has a cover main body portion 31 having a bottomed box shape that the lower surface side is open, and right and left cover flange portions 32 extending from the front lower end part of the cover main body portion 31 in the right and left direction. The cover body 30 is attached to the slider body 10 in a cantilever state by fixing a fixed end part which is one end part (front lower end part) of the cover body 30 to a front end part of the upper blade 20.

Thereby, between the free end portion (rear end part) 33 which is the other end part of the cover body 30 and the upper blade 20 of the slider body 10, the tab insertion gap 16 capable of passing the attaching shaft portion 71 of the tab 70 through is formed. Also, in a side view of the slider 1, in a region between the fixed end part of the tab 70 and the free end portion 33 in the slider length direction, a regulating space which can accommodate the attaching shaft portion 71 of the tab 70 and regulates (restricts) a movable range of the attaching shaft portion 71 is formed between the slider body 10 and the cover body 30.

The cover main body portion 31 has a ceiling portion 34 disposed continuously from a front surface of the cover main body portion 31 to a rear surface via an upper surface, and right and left side wall portions 35 hanging downward from right and left side edge parts of the ceiling portion 34. Also, inside the cover main body portion 31, an inner space surrounded by the ceiling portion 34 and the right and left side wall portions 35 is formed, and a part of the stop pawl body 40 and a part of the open and close member 50 are accommodated in the inner space of the cover main body portion 31.

In an inner surface of the ceiling portion 34 of the cover main body portion 31, spring holding portions 36 which hold (stops in an engaging state) one end part and the other end part of the plate spring member 60 are provided, as shown in FIG. 5 etc. In Embodiment 1, the spring holding portions 36 are disposed on an inner surface of a front curved part curving from the front surface to the upper surface of the cover main body portion 31, and on an inner surface of a rear curved part curving from the upper surface to the rear surface of the cover main body portion 31.

The spring holding portion 36 disposed at the cover main body portion 31 is formed substantially same as the spring holding portion disposed at the cover body in Patent Document 3 (the cover body 30 and the spring holding portion 36 of Embodiment 1 are respectively called as the tab holding body and the fixing portion in Patent Document 3).

The plate spring member 60 is stably mounted on the inner space of the cover body 30 with the two spring holding portions 36. In this case, the plate spring member 60 is hooked to be able to move in a small range in each spring holding portion 36 so as to elastically deform smoothly. In the present invention, a method or a means to attach the plate spring member 60 to an inside of the cover body is not particularly limited.

On the right and left side wall portions 35 in the free end portion 33 of the cover body 30, facing edge portions 33a formed in a downward concaved shape (a shape that an upper side is concaved) are disposed so as to face the vertical wall portions 24 provided on the upper blade 20. The facing edge portions 33a are provided as above, thereby the tab insertion gap 16 between the upper blade 20 and the cover body 30 can secure a size to be able to pass the attaching shaft portion 71 of the tab 70 despite the vertical wall portions 24 having a substantially triangle shape is provided on the upper blade 20.

Further, at the right and left side wall portions 35 in the cover body 30, protruded edge portions 39 are disposed between a center edge portion 38 disposed above the regulating space which regulates a move of the attaching shaft portion 71 of the tab 70 as mentioned above, and the facing edge portions 33a provided in a concave manner in the free end portion 33 and obliquely protruding downward. Since the protruded edge portions 39 are provided at the cover body 30, the attaching shaft portion 71 of the tab 70 can be supported with the protruded edge portions 39 of the cover body 30 even when the tab 70 is drawn up and oblique to twist with respect to the cover body 30 in the assembled slider 1, for example. Thus, the attaching shaft portion 71 of the tab 70 can be prevented from exiting from between the slider body 10 and the cover body 30 and dropping.

Each of the right and left cover flange portions 32 in the cover body 30 has a first flange portion disposed at a front end part and a second flange portion disposed behind the first flange portion and having smaller width dimension than the first flange portion. Such right and left cover flange portions 32 are fitted into right and left slide groove portions 23 provided at a front end part of the upper blade 20.

The stop pawl body 40 of Embodiment 1 has a pawl base end portion 41 supported to be swingable by the attaching support column 21 of the slider body 10, an upper arm portion 42 and a lower arm portion 43 branching from the pawl base end portion 41 and extending rearward, and a pawl portion 44 protruded downward at a tip end part (rear end part) of the lower arm portion 43 and protruded in the element guide path via the pawl hole 15 of the slider body 10.

In the pawl base end portion 41 of the stop pawl body 40, a pivot support concave portion 41a placed over the pivot convex portion 21a of the attaching support column 21 of the slider body 10 in a swingable manner is provided to open downward. Also, between the upper arm portion 42 and the lower arm portion 43 of the stop pawl body 40, an accommodating space portion 45 (also called as operation concave groove portion) which opens rearward is formed, and the attaching shaft portion 71 of the tab 70 which is to be inserted via the tab insertion gap 16 is accommodated in the accommodating space portion 45 of the stop pawl body 40.

The stop pawl body 40 is attached to the slider body 10 so that the pivot concave portion 41a of the pawl base end portion 41 is placed over the pivot convex portion 21a of the attaching support column 21 to be along the slider length direction. Thereby, the stop pawl body 40 is supported (pivoted) by the attaching support column 21 so that the upper arm portion 42, the lower arm portion 43 and the pawl portion 44 can swing in the upper and lower direction (slider height direction) with respect to the slider body 10 while contacting the pivot convex portion 21a of the attaching support column 21.

The open and close member 50 of Embodiment 1 is formed independently as a separate member from the stop pawl body 40. The open and close member 50 is attached to the slider body 10 so that the attaching shaft portion 71 of the tab 70 accommodated between the upper arm portion 42 and the lower arm portion 43 of the stop pawl body 40 blocks (cut off) the tab insertion gap 16 not to be removed from the tab insertion gap 16.

The open and close member 50 of Embodiment 1 has a supported base portion 51 disposed at a front end part of the open and close member 50 and supported by the attaching support column 21 of the slider body 10 in a swingable manner, a cross-link portion 52 extending from the supported base portion 51 rearward and disposed to slope downward from an intermediate position in a side view of the open and close member 50, and a stopper portion 53 further extending rearward from the cross-link portion 52 and formed to bulge downward in a side view of the open and close member 50.

In the open and close member 50, an accommodating space portion 54 opened downward is formed so as to be surrounded by the supported base portion 51, the cross-link portion 52 and the stopper portion 53, and in the accommodating space portion 54 of the open and close member 50, the attaching shaft portion 71 of the tab 70 to be inserted through the tab insertion gap 16 is accommodated.

At the supported base portion 51 of the open and close member 50, a pivot concave portion 51a placed over the pivot convex portion 21a of the attaching support column 21 in the slider body 10 is provided in a swingable manner so as to open downward. Since the open and close member 50 is attached to the slider body 10 so that the pivot concave portion 51a is placed over the pivot convex portion 21a of the attaching support column 21, the open and close member 50 is supported (pivoted) by the attaching support column 21 so that the stopper portion 53 is swingable in the upper and lower direction with respect to the slider body 10 while being contacted with the pivot convex portion 21a of the attaching support column 21. The cross-link portion 52 has a shape such that the width dimension is gradually increased to the rear when the open and close member 50 is viewed from above (see FIG. 7).

The stopper portion 53 has a front end surface 53a extending from a rear end part of the cross-link portion 52 downward in an arc shape and facing frontward in a side view, and the front end surface 53a of the stopper portion 53 serves as a tab axis receiving surface on which the attaching shaft portion 71 of the tab 70 is contacted when the tab 70 is attached and the slider 1 is formed.

The front end surface (tab axis receiving surface) 53a of the stopper portion 53 has a curved surface (or a sloped surface) at the lower end part of the stopper portion 53 so as to slope downward to the front so that the lower end part protrudes frontward. Since the front end surface 53a of the stopper portion 53 is formed as above, when the tab 70 attached to the slider 1 is pulled and the attaching shaft portion 71 is lifted, the attaching shaft portion 71 can be held so as to be covered with the stopper portion 53 and the cross-link portion 52 of the open and close member 50. Therefore, the attaching shaft portion 71 of the tab 70 can be prevented from accidently moving around under the open and close member 50. As a result, it can be prevented that the open and close member 50 is lifted to a passing position by the attaching shaft portion 71 of the tab 70, and that the attaching shaft portion 71 exits rearward through the tab insertion gap 16.

The stopper portion 53 of Embodiment 1 has a wide width portion 53b formed to have a larger width dimension than the cross-link portion 52, and the wide width portion 53b is accommodated between the right and left vertical wall portions 24 (held to be interposed between the right and left vertical wall portions 24) provided on the upper blade 20 when the open and close member 50 is attached to the slider body 10.

In this case, the maximum width dimension of the wide width portion 53b is set to be the same size (or slightly smaller than) the width dimension W1 between inner wall surfaces of the right and left vertical wall portions 24 provided on the upper blade 20 as mentioned above. Thereby, when the open and close member 50 of Embodiment 1 is attached to the slider body 10, the open and close member 50 can be easily positioned. Further, the open and close member 50 attached to the slider body 10 can be prevented from being displaced, leaned or bumped in the upper and lower direction.

Figure 9:
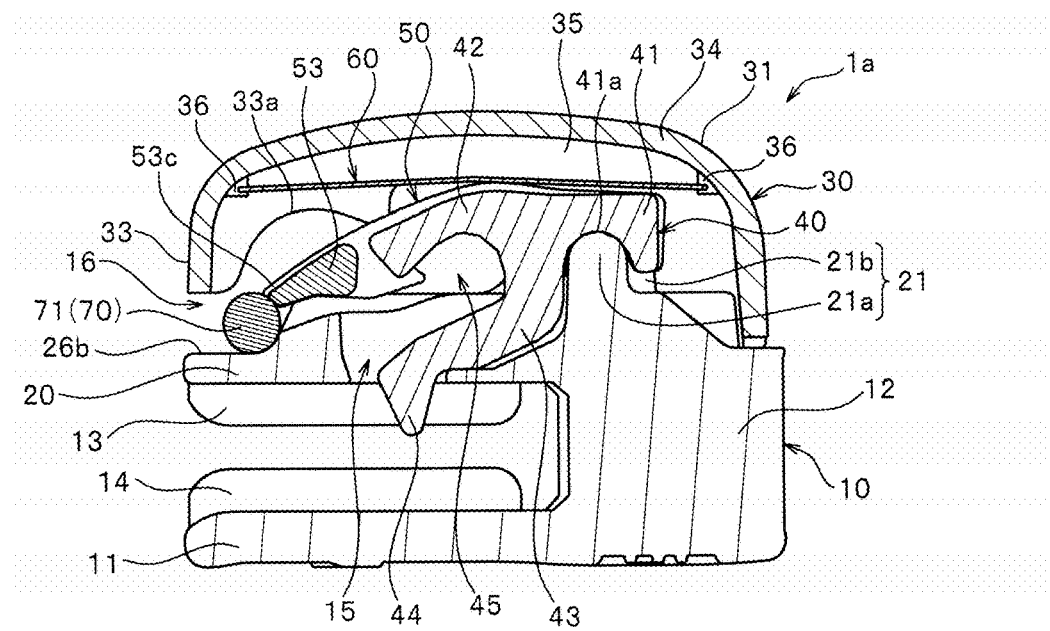
FIG. 9 is a cross-sectional view explaining a state that in the attaching operation of the tab, an attaching shaft portion of the tab is inserted into the tab insertion gap of the primary assembly body.

Further, the stopper portion 53 of Embodiment 1 has, when the slider 1 (or a primary assembled body 1a) is formed by attaching the open and close member 50 to the slider body 10, a rear end protruded portion 53c protruded rearward further from the right and left vertical wall portions 24 provided on the upper blade 20 in a side view of the slider 1 (or the primary assembled body 1a) as shown in FIG. 3. The rear end protruded portion 53c also has, in a side view of the slider 1 (or the primary assembled body 1a), a contacting surface 53d disposed in a direction crossing with the step surface of the step portion 25 and contacting the attaching shaft portion 71 at the time of insertion of the tab 70 as shown in FIG. 9.

In the slider 1 of Embodiment 1, the stop pawl body 40 and the open and close member 50 (particularly the supported base portion 51 and the cross-link portion 52 in the open and close member 50) are assembled to the slider body 10 disposed to line alongside in the slider width direction as shown in the plan view in FIG. 7, for example.

In Embodiment 1, the supported base portion 51 and the cross-link portion 52 are disposed parallel to the slider length direction. Meanwhile, the stop pawl body 40 is disposed to be oblique with respect to the supported base portion 51 and the cross-link portion 52 of the open and close member 50 (or the slider length direction).

In this case, an oblique angle α of the stop pawl body 40 with respect to the supported base portion 51 and the cross-link portion 52 of the open and close member 50, or with respect to the slider length direction is set at 20° or smaller, preferably 10° or smaller. In a case of Embodiment 1, the oblique angle α of the stop pawl body 40 is set at 5°.

In the present invention, the stop pawl body 40 and the supported base portion 51 and the cross-link portion 52 of the open and close member 50 may be formed to be disposed in parallel with the slider length direction. Alternatively, the stop pawl body 40 may be disposed parallel to the slider length direction, and the supported base portion 51 and the cross-link portion 52 of the open and close member 50 may be disposed to be oblique with respect to the slider length direction.

A plate spring member 60 of Embodiment 1 is formed by punching a metal piece having a predetermined shape from a continuous long-length metal plate member such as stainless steel. It is also possible to perform bending processing to the plate spring member 60, if necessary. In one end part (front end part) and the other end part (rear end part) of the plate spring member 60, a hole portion 61 which is open so as to cut off inward from each of a front end edge and a rear end edge of the plate spring member 60 is formed.

The plate spring member 60 of Embodiment 1 is attached to an inside of the cover body 30 by being held with the spring holding portions 36 of the cover body 30 using the hole portions 61 provided on the both end parts. In Embodiment 1, the plate spring member 60 is attached to an inside of the cover body 30 as a single urging member which urges the stop pawl body 40 so that the pawl portion 44 is protruded in the element guide path of the slider body and urges the open and close member 50 toward a blocking position.

The tab 70 of Embodiment 1 is entirely formed integrally. The tab 70 has a tab main body portion 72 in a thin plate shape and serving as a picking part to be picked up with fingers, right and left tab arm portions 73 extending from one end part of the tab main body portion 72 and the attaching shaft portion 71 disposed linearly between tip end parts of the tab arm portions 73 so as to connect tip end parts of the right and left tab arm portions 73.

In this case, the attaching shaft portion 71 has a shape that a cross-section perpendicular to the length direction (connecting direction) of the attaching shaft portion 71 shows a circular shape. An open window portion 74 having a rectangular shape is formed to be surrounded by the tab main body portion 72, the right and left tab arm portions 73 and the attaching shaft portion 71 of the tab 70. When the tab 70 is attached to the slider 1 afterward, the cover body 30 of the slider 1 is inserted to the open window portion 74 of the tab 70. In the present invention, a shape, a size and a material of the tab is not particularly limited, and can be changed randomly.

Subsequently, a step of assembling the slider 1 for a slide fastener according to Embodiment 1 is described.

First, a step (first assembly step) of attaching the open and close member 50 and the stop pawl body 40 to the slider body 10 is performed. In Embodiment 1, first, the open and close member 50 is attached to the slider body 10. Specifically, the supported base portion 51 of the open and close member 50 is inserted between the right and left support wall portions 21b of the attaching support column 21 so that the pivot concave portion 41a of the open and close member 50 is stopped in an engaging state to the pivot convex portion 21a of the attaching support column 21. Simultaneously, the stopper portion 53 of the open and close member 50 is inserted and accommodated between the right and left vertical wall portions 24 provided on the upper blade 20. At this time, the maximum width dimension of the stopper portion 53 is set at the same size as (or slightly smaller than) a width dimension W1 between the inner wall surfaces of the right and left vertical wall portions 24, as mentioned above. Therefore, the open and close member 50 can be positioned easily and stably.

Subsequently, the stop pawl body 40 is attached to the slider body 10 to which the open and close member 50 is attached. Specifically, the pawl base end portion 41 of the stop pawl body 40 is inserted between the right and left support wall portions 21b of the attaching support column 21 as well as adjacent to the supported base portion 51 of the open and close member 50 by stopping the pivot concave portion 41a of the stop pawl body 40 in an engaging state to the pivot convex portion 21a of the attaching support column 21. Simultaneously, the lower arm portion 43 and the pawl portion 44 of the stop pawl body 40 are inserted to the pawl hole 15 of the slider body 10. At this time, the open and close member 50 is attached to the slider body 10 at a predetermined position, thereby, the stop pawl body 40 can be positioned easily and stably by using the open and close member 50.

Figure 8:
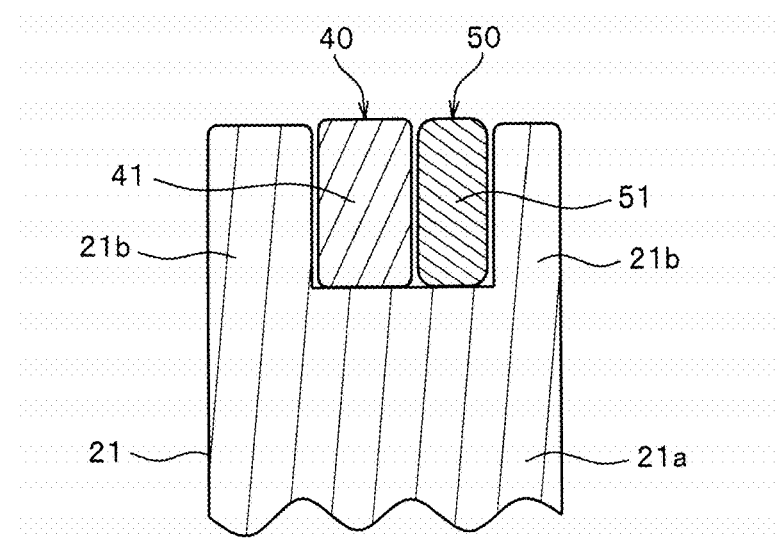
FIG. 8 is a cross-sectional view taken along a line VIII-VIII shown in FIG. 7.

Thereby, as shown in FIG. 7 and FIG. 8, the open and close member 50 and the stop pawl body 40 are arranged at a predetermined position on the slider body 10 in a position to be alongside each other. The pivot concave portion 41a of the open and close member 50 and the pivot concave portion 41a of the stop pawl body 40 are engaged to be placed over the pivot convex portion 21a of the attaching support column 21, and the open and close member 50 and the stop pawl body 40 are rotatably supported with respect to the pivot convex portion 21a while contacting the pivot convex portion 21a of the attaching support column 21.

Thereby, the open and close member 50 and the stop pawl body 40 are pivoted such that the cross-link portion 52 and the stopper portion 53 of the open and close member 50, and the upper arm portion 42, the lower arm portion 43 and the pawl portion 44 of the stop pawl body 40 can swing up and down with respect to the slider body 10. At this time, an upper surface disposed at a highest position of the cross-link portion 52 of the open and close member 50 and an upper surface disposed at a highest position of the upper arm portion 42 of the stop pawl body 40 are disposed at the substantially same height position.

In Embodiment 1, a case is explained that the stop pawl body 40 is attached to the slider body 10 after the open and close member 50 is attached. However, the attaching order of the open and close member 50 and the stop pawl body 40 is not particularly limited in the present invention. The open and close member 50 may be attached after the stop pawl body 40 is attached to the slider body 10, or the open and close member 50 and the stop pawl body 40 may be attached to the slider body 10 simultaneously.

As mentioned above, the open and close member 50 and the stop pawl body 40 are attached to the slider body 10. In the meantime, apart from the attaching step (first assembly step), a step (second assembly step) of mounting the spring plate member 60 in an inner space of the cover body 30 is performed.

In this step, the plate spring member 60 is assembled in an inner surface side of a ceiling portion 34 of the cover body 30 so that each hole portion 61 formed at a front end part and a rear end part of the plate spring member 60 is adjusted at a position of each spring holding portion 36 of the cover body 30. Further, the spring holding portions 36 of the cover body 30 are pressed to be plastically deformed (in other words, fastened). Thereby, the plate spring member 60 is attached in an inner side of the cover body 30 to be able to elastically deform and move in a small range.

Thereafter, a step (third assembly step) of incorporating and fixing the cover body 30 to which the plate spring member 60 is attached in an inner side is performed with respect to the slider body 10 to which the open and close member 50 and the stop pawl body 40 are attached.

In this step, the fixed end part of the cover main body portion 31 and the cover flange portions 32 are inserted into the fitting concave portion 22 and the slide groove portions 23 provided at a front end part of the upper blade 20 by being moved rearward from a front side of the upper blade 20, and further the cover body 30 is slid rearward along the slide groove portions 23. Thereby, a part of the fixed end part of the cover main body portion 31 and the cover flange portions 32 are accommodated in the fitting concave portion 22 and the slide groove portions 23 of the upper blade 20.

Subsequently, a part of the front end part disposed to be placed over the right and left slide groove portions 23 in the upper blade 20 is plastically deformed (crushed by pressing) so as to be pressed to crush locally from above, thereby the locally pressed part is fixed by pressing to the cover flange portions 32 of the cover body 30. Thus, the cover body 30 is fixed to the slider body 10. At this time, outer side surfaces of the right and left support wall portions 21b in the slider body 10 and inner wall surfaces of the right and left side wall portions 35 of the cover body 30 are contacted, thereby the cover body 30 can be fixed to the slider body 10 more firmly without bumping. In the present invention, a fixing means fixing the cover body 30 to the slider body 10 is not particularly limited, and bonding or welding can also be used.

As mentioned above, a primary assembly body 1a of the slider 1 as shown in FIGS. 3 to 6 is produced by assembling the cover body 30 to which the spring plate member 60 is mounted to the slider body 10 to which the open and close member 50 and the stop pawl body 40 are attached.

On the primary assembly body 1a, a tab insertion gap 16 capable of passing the attaching shaft portion 71 of the tab 70 through is formed between the upper blade 20 of the slider body 10 and the free end portion 33 of the cover body 30.

In the case of Embodiment 1, in particular, the right and left vertical wall portions 24 are disposed on the upper blade 20, the second upper surface (rear end side upper surface) 26b is formed low at the rear end part of the upper blade 20 via the step portion 25, and facing edge portions 33a having a concave shape are disposed at the free end portion 33 of the cover body 30 to face the vertical wall portions 24 of the upper blade 20.

Therefore, the tab insertion gap 16 interposed by the upper blade 20 and the free end portion 33 of the cover body 30 is formed to wind up and down from an insertion part (entrance) of the tab insertion gap 16 positioned at a rear end of the primary assembly body 1a to a space disposed in a region between the fixed end part and the free end portion 33 of the cover body 30 which can accommodate the attaching shaft portion 71 of the tab 70 in a side view of the primary assembly body 1a (FIG. 3).

In the primary assembly body 1a of Embodiment 1, a part of the stop pawl body 40 and a part of the open and close member 50 are accommodated in the cover main body portion 31 of the cover body 30. The stop pawl body 40 and the open and close member 50 are pivoted by the attaching support column 21 of the slider body 10 in a state that the upper surface of the stop pawl body 40 (particularly the upper surface of the upper arm portion 42) and the upper surface of the open and close member 50 (particularly the upper surface of the cross-link portion 52) are contacted with the single plate spring member 60 mounted to the cover body 30.

Figure 10:
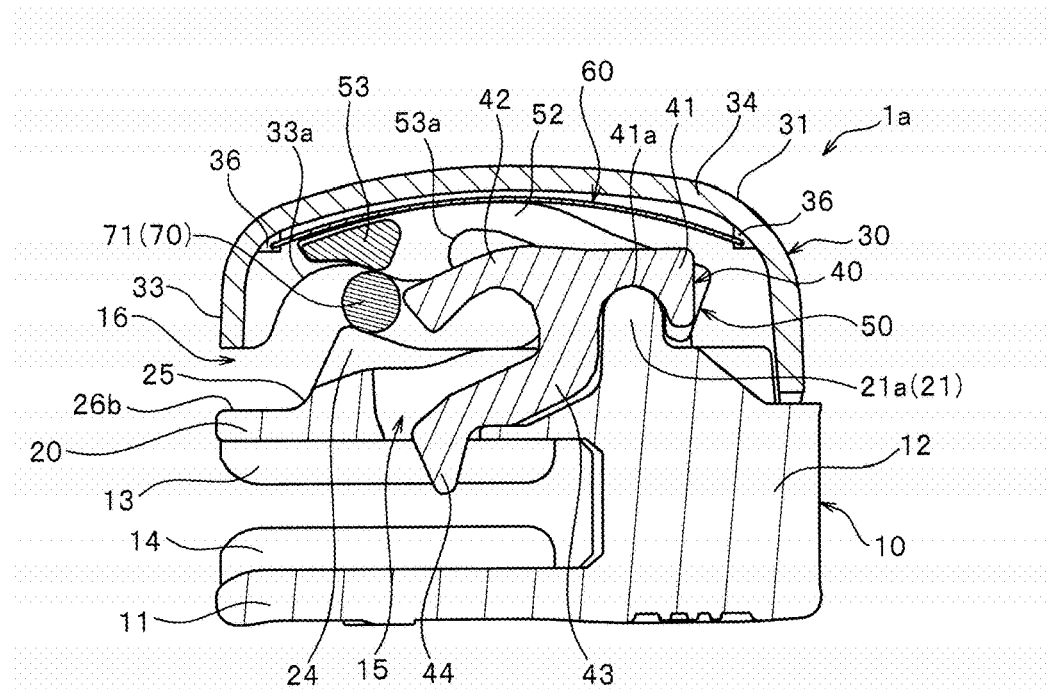
FIG. 10 is a cross-sectional view explaining a state that in the attaching operation of the tab, the open and close member is lifted and moved to a passing position by the attaching shaft portion of the tab.

Further, the open and close member 50 is pivoted so that the stopper portion 53 can swing up and down between a position that, in a side view of the slider 1, the open and close member 50 does not overlap the tab insertion gap 16 (that is, a passing position that the attaching shaft portion 71 of the tab 70 can pass the tab insertion gap 16 as shown in FIG. 10) and a blocking position that, in a side view of the slider 1, the open and close member 50 blocks passing the attaching shaft portion 71 by overlapping the tab insertion gap 16 (particularly the position that the stopper portion 53 is contacted with the upper surface 26a of the upper blade 20).

At the same time, the stopper portion 53 of the open and close member 50 is placed on an upper surface (placing surface) between the right and left vertical wall portions 24 of the upper blade 20 in a state that the open and close member 50 is contacted with the plate spring member 60, and holds the open and close member 50 at the above-mentioned blocking position. Therefore, when the open and close member 50 is lifted even at a little from the blocking position that the stopper portion 53 is contacted with the upper surface 26a of the upper blade 20, the open and close member 50 receives an urging force from the plate spring member 60 that the stopper portion 53 is urged to a position that the stopper portion 53 is contacted with the upper surface 26a of the upper blade 20.

The pawl portion 44 of the stop pawl body 40 is protruded in the element guide path via the pawl hole 15 of the slider body 10 in a state that the stop pawl body 40 is contacted with the plate spring member 60. Therefore, when the stop pawl body 40 is lifted so that the pawl portion 44 exits from the element guide path, the stop pawl body 40 receives an urging force from the plate spring member 60 in a direction to making the pawl portion 44 of the stop pawl body 40 protruded in the element guide path.

Then, for attaching the tab 70 to the primary assembly body 1*a* of the slider 1, a step of attaching the tab 70 is performed as below.

First, the attaching shaft portion 71 of the tab 70 is inserted into the tab insertion gap 16 between the upper blade 20 of the slider body 10 and the cover body 30 from a rear side of the primary assembly body 1*a*, and further the attaching shaft portion 71 is contacted with a step surface of the step portion 25 of the upper blade 20.

At this time, the step portion 25 is provided at the upper blade 20, and the above-mentioned rear end protruded portion 53*c* protruded further to the rear of the right and left vertical wall portions 24 of the slider body 10 is provided at the stopper portion 53 of the stop pawl body 40. Therefore, by inserting the attaching shaft portion 71 of the tab 70 so as to contact with the step surface of the step portion 25 of the upper blade 20, the attaching shaft portion 71 of the tab 70 can be easily contacted with the rear end protruded portion 53*c* (particularly the above-mentioned contacted surface 53*d* of the rear end protruded portion 53*c*) of the stopper portion 53. Further, thereby the attaching shaft portion 71 of the tab 70 can lift (move) upward the open and close member 50 stably in resistance to the urging force (elastic force) of the plate spring member 60 from a position that the stopper portion 53 is contacted with the upper surface 26*a* of the upper blade 20.

Figure 11:
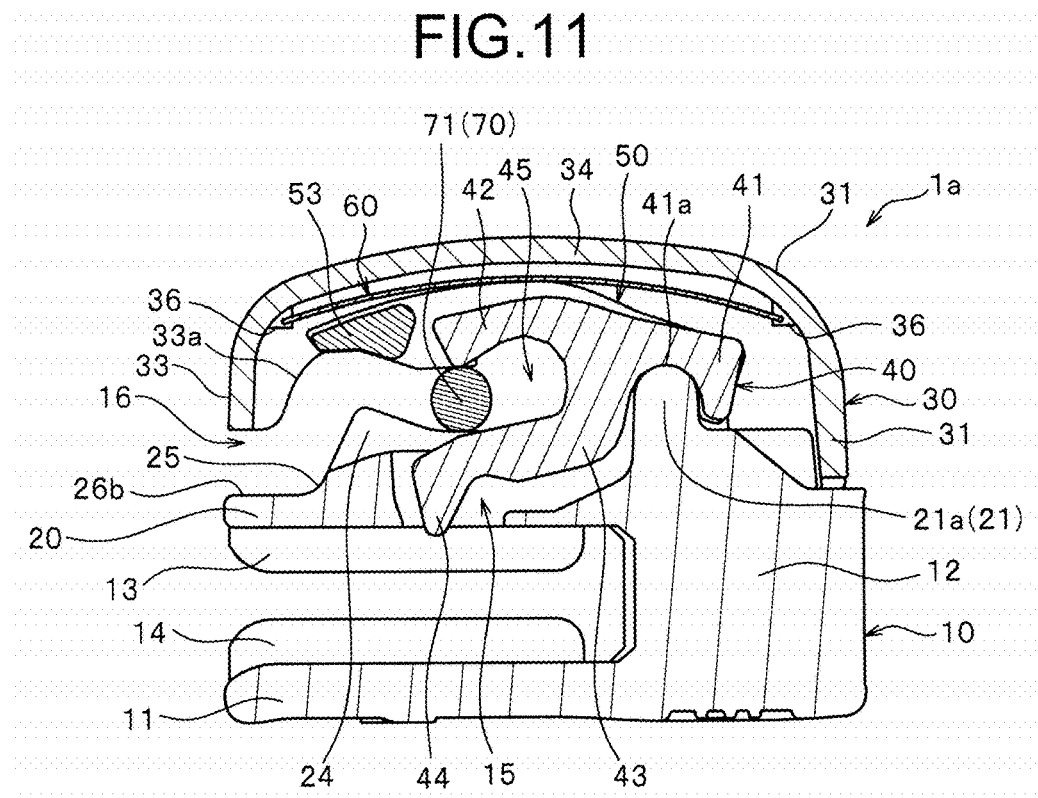
FIG. 11 is a cross-sectional view explaining a state that in the attaching operation of the tab, the stop pawl body is lifted by the attaching shaft portion of the tab.

Furthermore, the attaching shaft portion 71 of the tab 70 is pushed in toward the front from a state of contacting with the step surface of the step portion 25 of the upper blade 20 along the tab insertion gap 16 disposed winding up and down while slide-contacting with the vertical wall portions 24 of the upper blade 20. Thereby, the attaching shaft portion 71 further lifts the open and close member 50 to move to a passing position that the attaching shaft portion 71 can pass through the tab insertion gap 16, and moves to a position contacting the upper arm portion 42 of the stop pawl body 40, as shown in FIG. 10. Then, the attaching shaft portion 71 of the tab 70 is further pushed in frontward while slide-contacting with the upper surface 26*a* of the upper blade 20 or the cover body 30, thereby the attaching shaft portion 71 moves to contact the rear end surface of the upper arm portion 42 while slide-contacting the lower surface of the stopper portion 53 of the open and close member 50, and further lifts the upper arm portion 42 upward (moves the stop pawl body 40 upward), as shown in FIG. 11.

Thereafter, the attaching shaft portion 71 of the tab 70 is pushed to the front of the stopper portion 53 of the open and close member 50, and moved under the cross-link portion 52 of the open and close member 50. Thereby, the attaching shaft portion 71 of the tab 70 is entered into the accommodating space portion 45 between the upper arm portion 42 which is lifted upward and the lower arm portion 43, and is accommodated in the accommodating space portion 45 as shown in FIG. 12.

Due to a move of the attaching shaft portion 71 to the front of the position of the stopper portion 53, the open and close member 50 is not interfered by the attaching shaft portion 71 and the stopper portion 53, and is lowered from the above-mentioned passing position by receiving the urging force (elastic force) from the plate spring member 60, and the stopper portion 53 is contacted with the upper surface 26*a* of the upper blade 20. Thereby, the open and close member 50 holds the tab insertion gap 16 in a blocking state. Further, the upper arm portion 42 and the lower arm portion 43 of the stop pawl body 40 gradually lowers along with the move of the attaching shaft portion 71 of the tab 70 frontward in the accommodating space portion 45, and the pawl portion 44 of the stop pawl body 40 is protruded in the element guide path.

Then, the attaching step of the tab 70 as mentioned above is finished, and the slider 1 of Embodiment 1 to which the tab 70 is attached to the primary assembly body 1*a* is manufactured. In the attaching step of the tab 70, the tab 70 can be easily attached to the primary assembly body 1*a* by moving the attaching shaft portion 71 of the tab 70 frontward along the tab insertion gap 16 formed to wind up and down, as mentioned above. Particularly in Embodiment 1, there is no need to perform a pressing operation of the slide-contacting member in two steps (two-step slide operation) by the attaching shaft portion 71 of the tab 70, as in Patent Document 2 or Patent Document 3 as mentioned above. Therefore, the attaching operation of the tab 70 can be easily and promptly performed.

As mentioned above, in the slider 1 of Embodiment 1, it is possible that the above attaching step is performed continuously after assembling the primary assembly body 1*a* or at a desired time after an interval.

In the slider 1 of Embodiment 1, the pawl portion 44 can be protruded in the element guide path of the slider body 10 while the stop pawl body 40 is contacted with the plate spring member 60 at the non-operation state of the slider 1 in which the tab 70 is in a free state. Therefore, when a slide fastener is formed using the slider 1 of Embodiment 1, the slider 1 is provided with a stop mechanism with the stop pawl body 40 which can automatically lock the slider 1 at a stop position with respect to element rows.

Figure 13:
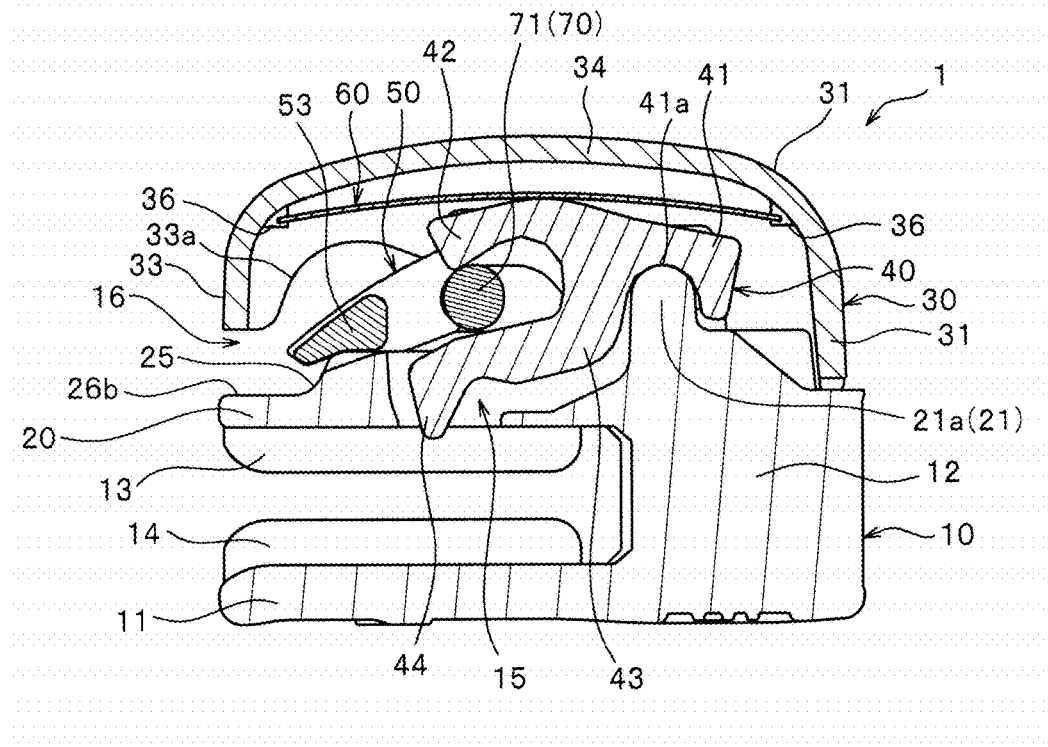
FIG. 13 is a cross-sectional view explaining a state that in a sliding operation of the slider, the stop pawl body is lifted by the attaching shaft portion of the tab.
Figure 14:
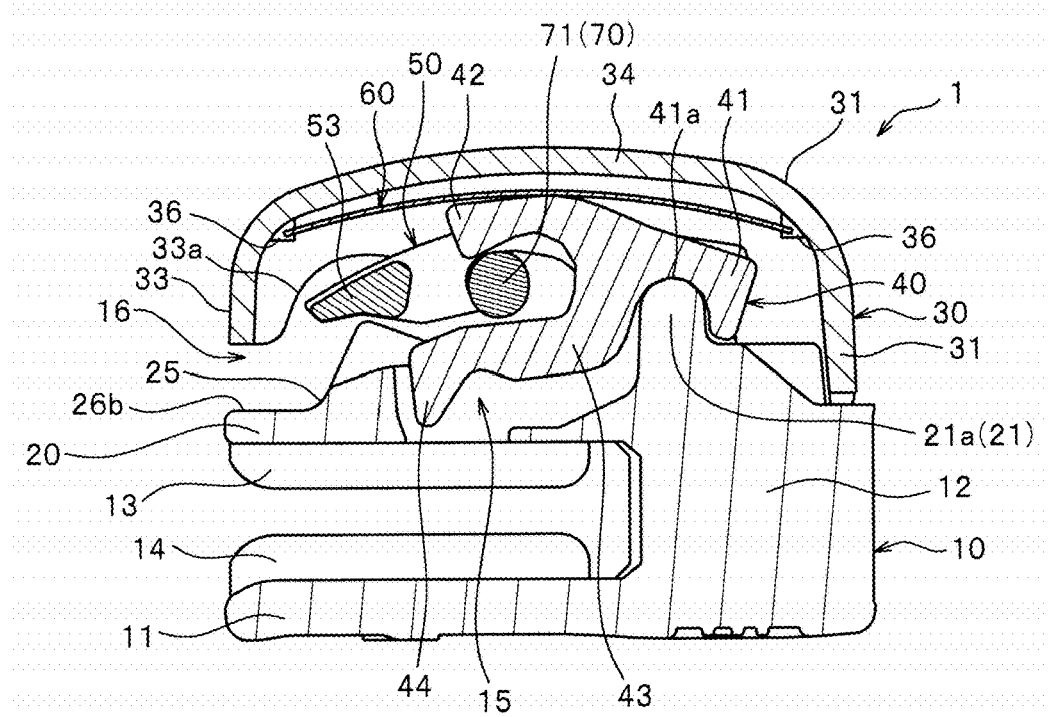
FIG. 14 is a cross-sectional view explaining a state that in the sliding operation of the slider, a lock state by the stop pawl body is released.

Further, in the slider 1 of Embodiment 1, the stop mechanism with the stop pawl body 40 can be easily released when the slider 1 is slide-operated by picking and pulling the tab 70 with fingers, as shown in FIG. 13 and FIG. 14.

Specifically, when the tab 70 is pulled to operate the slider 1, the attaching shaft portion 71 of the tab 70 is lifted, contacted with the upper arm portion 42 of the stop pawl body 40 as shown in FIG. 13, and further moves the upper arm portion 42 upward in resistance to the urging force of the plate spring member 60. Further, when the attaching shaft portion 71 of the tab 70 is lifted, the attaching shaft portion 71 moves the upper arm portion 42 further upward, thereby the pawl portion 44 of the stop pawl body 40 can be exited from the element guide path of the slider body 10. Thus, the stop mechanism with the stop pawl body 40 is released, and the slider 1 can be slide-operated along the element rows freely.

The slider 1 of Embodiment 1 is formed such that when the tab 70 is pulled and the attaching shaft portion 71 is lifted, the upper arm portion 42 of the stop pawl body 40 is contacted and lifted prior to the open and close member 50. Further, the front end surface (tab axis receiving surface) 53*a* of the stopper portion 53 of the open and close member 50 has the curved surface (or the sloped surface) sloped downward to the front, as mentioned above. Thereby, when the tab 70 is picked and pulled with fingers, the attaching shaft portion 71 of the tab 70 can be held to be embraced by the front end surface 53*a* of the stopper portion 53 and the lower surface of the cross-link portion 52 of the open and close member 50. Therefore, the attaching shaft portion 71 can be prevented from moving to come around under the open and close member 50, and is effectively prevented from exiting rearward through the tab insertion gap 16.

Further, despite the slider 1 of Embodiment 1 can attach the tab 70 to the primary assembly body 1*a* and has the stop mechanism with the stop pawl body 40, the slider 1 is formed in a simpler shape and structure such that the slider body 10 does not have a guide groove compared with the sliders in Patent Documents 1 to 3 as mentioned above.

Therefore, a mold used for molding the slider body 10 can also be formed in a simpler structure compared with those in Patent Documents 1 to 3, which enables cost reduction in manufacturing the mold. Further, the number to be able to mold in a single molding step of the slider body 10 can be easily increased compared with the cases in Patent Documents 1 to 3.

Additionally, in the slider 1 of Embodiment 1, since assembly work can be easy compared with the cases in Patent Documents 1 to 3, work efficiency can be improved, and productivity can be enhanced.

Accordingly, in the slider 1 of Embodiment 1, a significant reduction in manufacturing cost can be realized compared with the sliders in Patent Documents 1 to 3. Further, unlike the sliders in Patent Documents 1 and 2, the slider 1 of Embodiment 1 is formed without using a coil spring which costs high, and can be provided to market at a lower price.

In the slider 1 of Embodiment 1, the open and close member 50 and the stop pawl body 40 are disposed to be alongside each other, and the open and close member 50 is pivoted by the pivot convex portion 21a of the attaching support column 21 similar to the stop pawl body 40, thereby a swing range of the open and close member 50 in the upper and lower direction and a swing range of the stop pawl body 40 in the upper and lower direction are adjusted to the substantially same size. Thus, although the slider 1 of Embodiment 1 is capable of attaching the tab 70 afterward by using the open and close member 50 swinging up and down without using the slide member as in Patent documents 1 to 3, it can be formed without increasing the entire height dimension of the slider 1 compared with the sliders in Patent documents 1 to 3.

In addition, the right and left vertical wall portions 24 stand at the rear half part of the upper blade 20 in the slider 1 of Embodiment 1. Further, the tab insertion gap 16 is formed to wind up and down between the upper blade 20 and the free end portion 33 of the cover body 30, as mentioned above.

In a case that the slide fastener having the slider is attached to a fastener attached product such as clothing and the fastener attached product is washed, for example, the tab may be oblique to twist with respect to the cover body. At this time, if the vertical wall portions 24 as above are not provided in the slider, and the tab insertion gap is not formed to wind up and down as mentioned above, when the tab accidentally becomes oblique to twist with respect to the cover body to be in a certain posture, a part of the attaching shaft portion of the tab that is not disposed between the slider body and the cover body is entered into the tab insertion gap, and as a result, the attaching shaft portion with the twisted tab may exit from between the slider body and the cover body.

In contrast, the right and left vertical wall portions 24 are provided in the upper blade 20, and the tab insertion gap 16 is formed to wind up and down, as mentioned above. Therefore, even when the tab 70 is oblique to twist with respect to the cover body 30 by washing or the like, and the tab 70 is oblique with respect to the cover body 30 in any posture, it can be prevented that a part of the attaching shaft portion 71 of the tab 70 that is not disposed between the slider body 10 and the cover body 30 is entered in the tab insertion gap 16.

Further, in Embodiment 1, since the protruded edge portions 39 are provided at the right and left side wall portions 35 of the cover body 30, thereby, even when the tab 70 is lifted and oblique to twist with respect to the cover body 30, the attaching shaft portion 71 of the tab 70 is contacted with (supported by) the protruded edge portions 39 of the cover body 30, and the twist of the tab 70 can be regulated. As a result, it can be effectively prevented that the attaching shaft portion 71 with the twisted tab 70 exits from between the slider body 10 and the cover body 30 and is removed.

Since the stopper portion 53 of the open and close member 50 is fitted between the right and left vertical wall portions 24, it can also be prevented that the open and close member 50 is leaned or a position of the open and close member 50 is displaced in the slider width direction. Therefore, defects can be stably prevented such that the attaching shaft portion 71 of the tab 70 exits from between the slider body 10 and the cover body 30, and the like.

In the slider 1 of Embodiment 1 as above, the stop pawl body 40 and the open and close member 50 are pivoted by the pivot convex portion 21a of the attaching support column 21 in the slider body 10 so as to be interposed by the right and left support wall portions 21b, as shown in FIG. 8. However, the shape of the attaching support column pivoting the stop pawl body and the open and close member is not limited thereto, and other shapes can be adopted as long as the stop pawl body and the open and close member can be pivoted so that the upper arm portion, the lower arm portion and the pawl portion of the stop pawl body, and the cross-link portion and the stopper portion of the open and close member can swing up and down.

Figure 15:
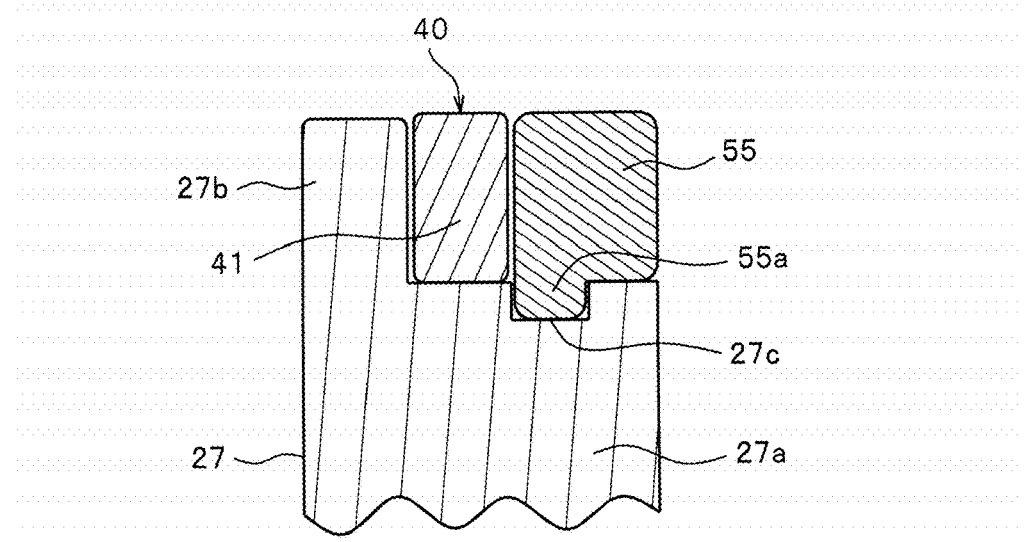
FIG. 15 is a partial cross-sectional view showing a modification example 1 of Embodiment 1.

FIG. 15 shows a partial cross-sectional view showing the attaching support column 27 of the slider body, the pawl base end portion 41 of the stop pawl body 40 and the supported base portion 55 of the open and close member according to a modification example (Modification Example 1), for example. In the descriptions and the figures according to the following modification examples (Modification Example 1 and Modification Example 2 as described later), parts or members having the substantially same structure as the slider 1 according to the above Embodiment 1 are represented by the same reference numerals and are not explained.

The attaching support column 27 in Modification Example 1 as shown in FIG. 15 has the pivot convex portion 27a pivoting the stop pawl body 40 and the open and close member 50 in a swingable manner, and the support wall portion 27b disposed on one side (right side) in the right and left direction of the pivot convex portion 27a. On an upper end part (top end part) of the pivot convex portion 27a, an insertion concave groove portion 27c which can insert a part of the open and close member 50 is concaved. The stop pawl body 40 in Modification Example 1 is formed similarly to the stop pawl body 40 of Embodiment 1 as mentioned above.

The open and close member in Modification Example 1 has a supported base portion 55 pivoted by the attaching support column 27, the cross-link portion 52 extending rearward from the supported base portion 55 and the stopper portion 53 further extending rearward from the cross-link portion 52. The supported base portion 55 in Modification Example 1 is formed to be thicker than the supported base portion 51 in the above Embodiment 1. In the supported base portion 55 in Modification Example 1, a pivot concave portion pivoted by the pivot convex portion 27a of the attaching support column 27 of the slider body is provided so as to open downward, and an insertion protruded rib portion 55a is protruded downward which is to be inserted into the insertion groove portion 27c provided at the attaching support column 27.

Also by adopting a shape of the open and close member having the attaching support column 27, the stop pawl body 40 and the supported base portion 55 in Modification Example 1, the open and close member and the stop pawl body 40 are disposed to the attaching support column 27 of the slider body at a predetermined position at a position relation to be alongside each other as well as the cross-link portion 52 and the stopper portion 53 of the open and close member, the upper arm portion 42, the lower arm portion 43 and the pawl portion 44 of the stop pawl body 40 are pivoted to be swingable up and down. When the primary assembly body of the slider as mentioned above is assembled, positioning of the open and close member with respect to the slider body or positioning of the stop pawl body 40 can be easily and stably performed.

Figure 17:
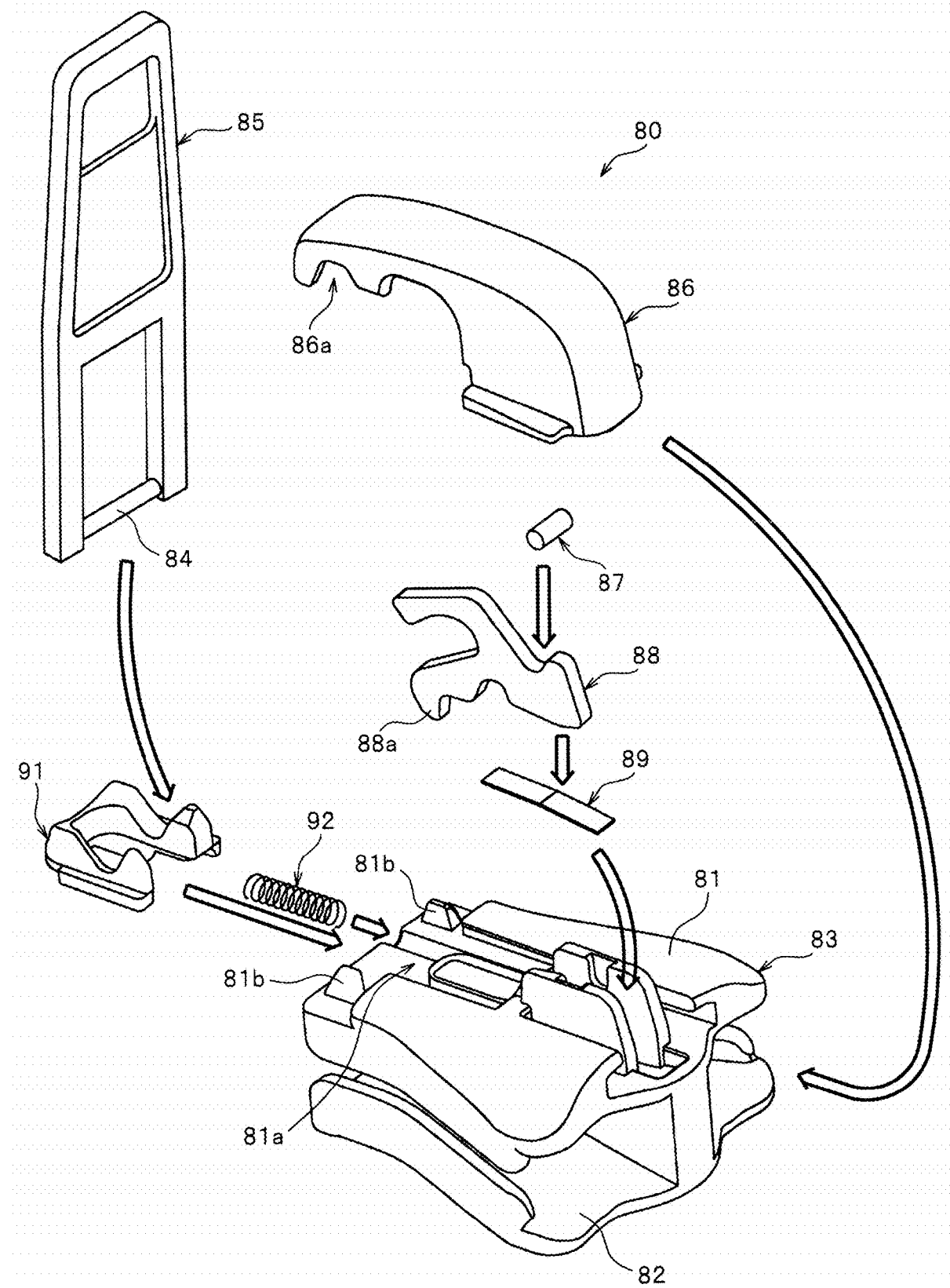
FIG. 17 is a disassembled perspective view showing a state that a conventional slider described in Patent Document 2 is disassembled.
Figure 18:
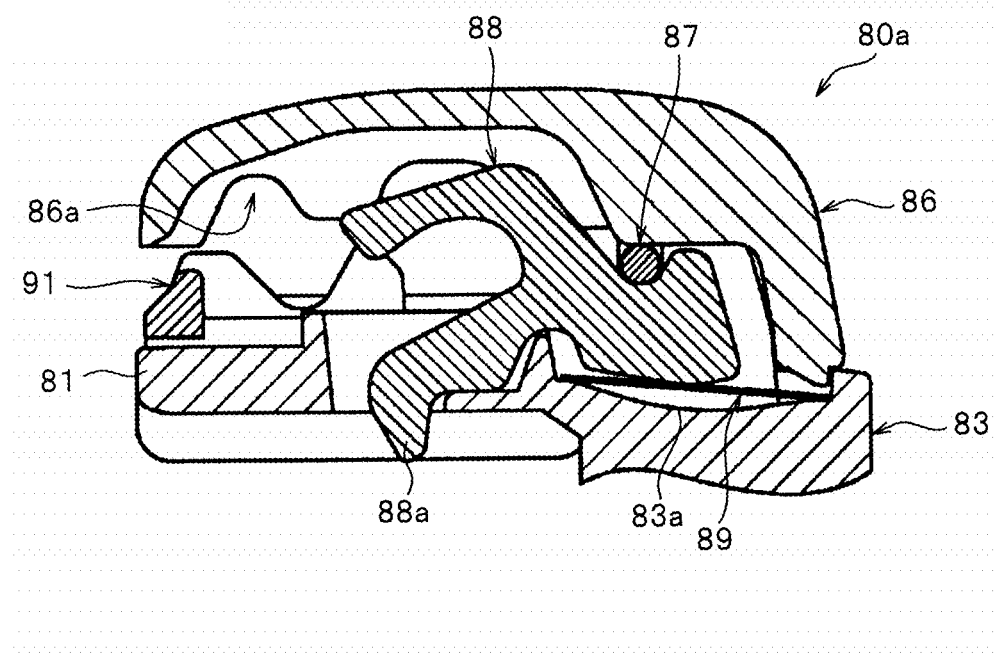
FIG. 18 is a cross-sectional view of the slider in Patent Document 2.
Figure 19:
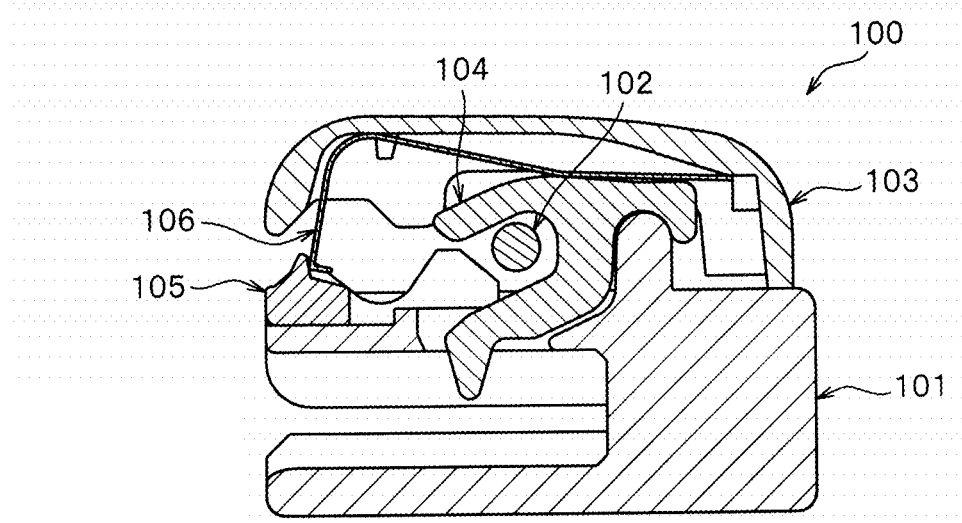
FIG. 19 is a cross-sectional view showing a conventional slider described in Patent Document 3.

In the slider 1 of the above-mentioned Embodiment 1, the plate spring member 60 as an urging member urges the stop pawl body 40 and the open and close member 50 in a state of being held on an inner surface side of the ceiling portion 34 of the cover body 30. In this invention, however, it is also possible that, as showing the primary assembly body 2a of the slider according to another modification example (Modification Example 2) in FIG. 16, a spring chamber 17 is provided at the slider body 10a as same as the slider of above-mentioned Patent Document 2 (see FIG. 17 and FIG. 18), and the plate spring member 60a is accommodated in the spring chamber 17, thereby the stop pawl body 40a and the open and close member 50a are urged as in the case of Patent Document 2 as mentioned above.

Figure 16:
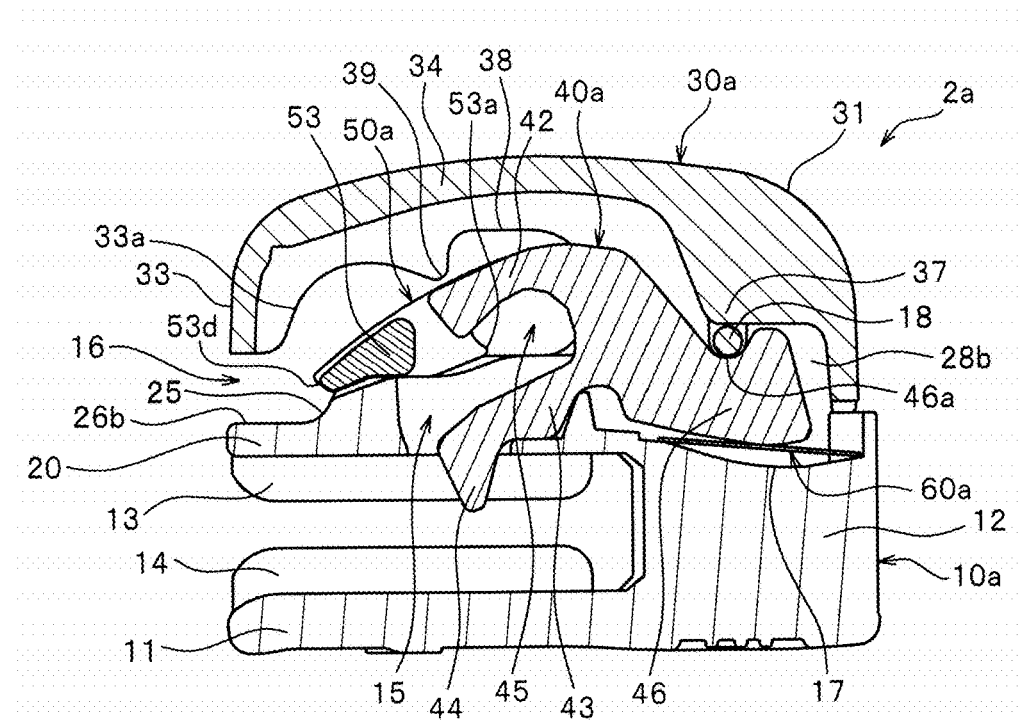
FIG. 16 is a cross-sectional view showing a slider according to Modification Example 2 of Embodiment 1.

In the primary assembly body 2a of the slider in Modification Example 2 as shown in FIG. 16, despite the stop pawl body 40a and the open and close member 50a are urged by the plate spring member 60a accommodated in the slider body 10a, the primary assembly body 2a of Modification Example 2 is formed substantially same as the primary assembly body 1a of the slider 1 in Embodiment 1 as mentioned above except the structure and the method for urging the stop pawl body 40a and the open and close member 50a by the plate spring member 60a. Accordingly, mainly described here is a part of the primary assembly body 2a of Modification Example 2 which is different from that in Embodiment 1.

In Modification Example 2, right and left support wall portions 28b disposed apart with an interval which can accommodate the stop pawl body 40a and the open and close member 50a stand on the slider body 10a. In inner wall surfaces of the right and left support wall portions 28b, a U-shape groove portion holding a pivot pin 18 pivoting the stop pawl body 40a in a swingable manner is formed to open upward. At a front end part of the slider body 10a, the spring chamber 17 accommodating the plate spring member 60a is provided between the right and left support wall portions 28b. The spring chamber 17 is formed to be able to permit elastic deformation of the plate spring member 60a.

The cover body 30a in Modification Example 2 is formed without having the spring holding portion 36 as in Embodiment 1 mentioned above. In the cover body 30a, a closing portion 37 is provided to block the above of the pivot pin 18 not to drop the pivot pin 18 which is held in the U-shape groove portion of the support wall portions 28b.

The stop pawl body 40a of Modification Example 2 has the pawl base end portion 46, the upper arm portion 42 and the lower arm portion 43 branching from the pawl base end portion 46 and extending rearward, and the pawl portion 44 provided at a tip end part of the lower arm portion 43. The upper arm portion 42, the lower arm portion 43 and the pawl portion 44 of the stop pawl body 40a are formed similarly to the stop pawl body 40 in the above-mentioned Embodiment 1.

The pawl base end portion 46 in Modification Example 2 has a shape different from the pawl base end portion 41 in the above Embodiment 1, and in an upper end part of the pawl base end portion 46, a pivot concave portion 46a pivoted by the pivot pin 18 which is held in the U-shaped groove portion is provided. The pawl base end portion 46 is placed above the plate spring member 60a accommodated in the spring chamber 17, and held and urged upward by the plate spring member 60a.

The open and close member 50a of Modification Example 2 has a supported base portion (not shown), a cross-link portion (not shown) extending rearward from the supported base portion, and a stopper portion 53 extending rearward further from the cross-link portion. The cross-link portion and the stopper portion 53 of the open and close member 50a is formed similarly to the open and close member 50 in the above-mentioned Embodiment 1. The supported base portion of Modification Example 2 is formed to have a cross-sectional shape similar to the cross-sectional shape of the pawl base end portion 26 as shown in FIG. 16. The supported base portion is placed above the plate spring member 60a accommodated in the spring chamber 17, and is supported and urged upward by the plate spring member 60a.

In the slider (primary assembly body 2a) of Modification Example 2, the open and close member 50a and the stop pawl body 40a are disposed on the slider body 10a at a position relation to be alongside each other, and the cross-link portion and the stopper portion 53 of the open and close member 50a and the upper arm portion 42, the lower arm portion 43 and the pawl portion 44 of the stop pawl body 40a are pivoted to be swingable up and down, similar to the case of slider 1 in Embodiment 1. Accordingly, the slider manufactured from the primary assembly body 2a of Modification Example 2 can obtain the same effect as the slider in the above-mentioned Embodiment 1.

Further, In Embodiment 1, Modification Example 1 and Modification Example 2, the plate spring member 60, 60a held by the cover body 30 or the slider body 10a is used as a member which urges the open and close member 50, 50a and the stop pawl body 40, 40a. In the invention, however, a coil spring can also be used instead of the plate spring member 60, 60a as the member which urges the open and close member 50, 50a and the stop pawl body 40, 40a.

REFERENCE SIGNS LIST

1 Slider
1a, 2a Primary assembly body
10, 10a Slider body
11 Lower blade
12 Guide column
13 Upper flange portion
14 Lower flange portion
15 Pawl hole
16 Tab insertion gap
17 Spring chamber
18 Pivot pin
20 Upper blade
21 Attaching support column
21a Pivot convex portion
21b Support wall portion
22 Fitting concave portion 23 Slide groove portion
24 Vertical wall portion
25 Step portion
26a First upper surface (main upper surface) of upper blade
26b Second upper surface (rear end side upper surface) of upper blade
27 Attaching support column
27a Pivot convex portion
27b Support wall portion
27c Insertion concave groove portion
28b Right and left support wall portions
30, 30a Cover body
31 Cover main body portion
32 Cover flange portion
33 Free end portion (rear end part)
33a Facing edge portion
34 Ceiling portion
35 Side wall portion
36 Spring holding portion
37 Closing portion
38 Center edge portion
39 Protruded edge portion
40, 40a Stop pawl body
41 Pawl base end portion
41a Pivot concave portion
42 Upper arm portion
43 Lower arm portion
44 Pawl portion
45 Accommodating space portion
46 Pawl base end portion
46a Pivot concave portion
50, 50a Open and close member
51 Supported base portion
51a Pivot concave portion
52 Cross-link portion
53 Stopper portion
53a Front end surface (tab axis receiving surface)
53b Wide width portion
53c Rear end protruded portion
53d Contact surface
54 Accommodating space portion
55 Supported base portion
55a Insertion protruded rib portion
60, 60a Plate spring member
61 Hole portion
70 Tab
71 Attaching shaft portion
72 Tab main body portion
73 Tab arm portion
74 Open window portion
W1 Width dimension between inner wall surfaces of right and left vertical wall portions
W2 Width dimension between outer wall surfaces of right and left vertical wall portions
α Oblique angle of stop pawl body

The invention claimed is:

1. A slider for a slide fastener, the slider including:
a slider body in which an upper blade and a lower blade are connected by a guide column,
a tab provided with an attaching shaft portion at one end part,
a stop pawl body provided with a pawl base end portion, an upper arm portion and a lower arm portion extending from the pawl base end portion and a pawl portion disposed at the lower arm portion, and
a cover body accommodating a part of the stop pawl body in an inside and fixed in a cantilever state to the upper blade;
in which the stop pawl body is urged toward the upper blade;
a tab insertion gap being able to pass the attaching shaft portion of the tab is provided between the upper blade and a free end portion of the cover body;
the stop pawl body is disposed such that the upper arm portion and the lower arm portion are disposed to be swingable up and down with respect to the slider body;
the stop pawl body protrudes the pawl portion to an element guide path formed between the upper blade and the lower blade by being urged toward the upper blade;
wherein:
an open and close member opening and closing the tab insertion gap is disposed alongside the stop pawl body in a slider width direction, and is disposed so that a rear end part of the open and close member is swingable up and down between a passing position at which the tab insertion gap is opened and the attaching shaft portion of the tab is passed, and a blocking position at which the attaching shaft portion is blocked not to be passed with respect to the slider body; and
the open and close member is urged toward the blocking position.

2. The slider according to claim 1 wherein an urging member which urges the stop pawl body and the open and close member is disposed.

3. The slider according to claim 1 wherein the open and close member has a supported base portion, a cross-link portion extending rearward from the supported base portion to extend across the above of the attaching shaft portion of the tab, and a stopper portion extending rearward from the cross-link portion and bulging downward to block the rear side of the attaching shaft portion of the tab, and
a front end part of the stopper portion has a tab axis receiving surface.

4. The slider according to claim 3 wherein the tab axis receiving surface is curved or sloped such that a lower end part of the stopper portion is sloped downward toward the front.

5. The slider according to claim 3 wherein the stopper portion of the open and close member has a wide width portion formed to be larger in the slider width direction than the cross-link portion.

6. The slider according to claim 3 wherein:
an attaching support column stands on a front end part of the upper blade,
the pawl base end portion of the stop pawl body and the supported base portion of the open and close member are supported by the attaching support column to be swingable.

7. The slider according to claim 1 wherein:
the upper blade has a right and left pair of vertical wall portions standing at a rear half part of the upper blade, and
the free end portion of the cover body has facing edge portions formed in a concave shape directed downward to face the vertical wall portions in a side view of the slider.

8. The slider according to claim 3 wherein:
the upper blade has a right and left pair of vertical wall portions disposed apart in the slider width direction to have an interval in which the stopper portion of the open and close member can be inserted, and the right and left vertical wall portions are disposed to have the interval between the right and left vertical wall portions to correspond to the maximum dimension of the stopper portion in the slider width direction.

9. The slider according to claim 7 wherein:
the upper blade has a first upper surface contacted with the tab, a second upper surface disposed behind the first upper surface and having a lower height position than the first upper surface, and a step portion provided behind the right and left vertical wall portions and disposed between the first upper surface and the second upper surface.

10. The slider according to claim 9 wherein:
the open and close member has a rear end protruded portion protruded rearward of the right and left vertical wall portions,
the rear end protruded portion of the open and close member has a contact surface disposed in a direction crossing a step surface of the step portion in a side view of the slider, and contacting the attaching shaft portion at the time of inserting the tab.

11. The slider according to claim 2 wherein the urging member is formed of a single plate spring member which urges the open and close member and the stop pawl body.

12. The slider according to claim 1 wherein at least when the tab is not operated, the stop pawl body and the open and close member are disposed at positions not overlapping each other in a top view of the slider.

* * * * *